US012177509B2

(12) United States Patent
Bax et al.

(10) Patent No.: US 12,177,509 B2
(45) Date of Patent: Dec. 24, 2024

(54) SYSTEM AND METHOD FOR LABELING AND PRESENTING CONTENT

(71) Applicant: Yahoo Ad Tech LLC, New York, NY (US)

(72) Inventors: Eric T Bax, Sierra Madre, CA (US); Lisa Giaffo, Pasadena, CA (US); Nikki M Thompson, Bloomfield, NJ (US); Melissa Gerber, Rancho Mission Viejo, CA (US); William W Wagner, Costa Mesa, CA (US)

(73) Assignee: Yahoo Ad Tech LLC, New York, NY (US)

( * ) Notice: Subject to any disclaimer, the term of this patent is extended or adjusted under 35 U.S.C. 154(b) by 47 days.

(21) Appl. No.: 18/144,205

(22) Filed: May 7, 2023

(65) Prior Publication Data
US 2024/0373083 A1    Nov. 7, 2024

(51) Int. Cl.
*H04N 21/431*      (2011.01)
*H04N 21/239*      (2011.01)
*H04N 21/2668*    (2011.01)
*H04N 21/442*      (2011.01)

(52) U.S. Cl.
CPC ..... *H04N 21/4312* (2013.01); *H04N 21/2393* (2013.01); *H04N 21/2668* (2013.01); *H04N 21/44213* (2013.01)

(58) Field of Classification Search
None
See application file for complete search history.

(56) References Cited

U.S. PATENT DOCUMENTS

| 8,204,357 B2* | 6/2012 | Hamada | H04N 21/4314 386/239 |
| 9,883,250 B2* | 1/2018 | Chai | H04N 21/4826 |
| 9,967,630 B2* | 5/2018 | Chai | G06F 3/04842 |
| 10,779,047 B2* | 9/2020 | Chai | H04N 21/4788 |
| 11,343,580 B2* | 5/2022 | Chai | H04N 21/4788 |
| 2009/0199227 A1* | 8/2009 | Kennedy | H04N 21/26216 725/13 |

(Continued)

FOREIGN PATENT DOCUMENTS

| CN | 107172135 A | * | 9/2017 | |
| CN | 110267065 A | * | 9/2019 | ......... H04N 21/2187 |

(Continued)

*Primary Examiner* — William J Kim
(74) *Attorney, Agent, or Firm* — Cooper Legal Group LLC

(57) ABSTRACT

In an example, a first content item is provided for display on a first client device. A first feedback signal is received. The first feedback signal is indicative of one or more first user reactions to display of the first content item on the first client device. The first content item is provided for display on a second client device. A second feedback signal is received. A first popularity score associated with the first content item is determined based upon the first feedback signal and the second feedback signal. A first popularity label is assigned to the first content item based upon the first popularity score. An enhanced content presentation interface including the first content item is generated based upon the first popularity label assigned to the first content item. The enhanced content presentation interface including the first content item is presented on a third client device.

20 Claims, 20 Drawing Sheets

(56) References Cited

U.S. PATENT DOCUMENTS

| | | | | |
|---|---|---|---|---|
| 2012/0060094 | A1* | 3/2012 | Irwin | H04N 21/4756 |
| | | | | 715/719 |
| 2015/0074552 | A1* | 3/2015 | Chai | H04N 21/482 |
| | | | | 715/753 |
| 2016/0080817 | A1* | 3/2016 | Chai | G06F 3/0482 |
| | | | | 725/43 |
| 2016/0182924 | A1* | 6/2016 | Todd | H04N 21/4622 |
| | | | | 725/116 |
| 2017/0039867 | A1* | 2/2017 | Fieldman | G09B 7/00 |
| 2019/0082224 | A1* | 3/2019 | Bradley | G06Q 30/0282 |
| 2019/0320242 | A1* | 10/2019 | Vaughn | H04N 21/4223 |
| 2021/0357447 | A1* | 11/2021 | Mckenzie | G11B 27/34 |

FOREIGN PATENT DOCUMENTS

| | | | |
|---|---|---|---|
| CN | 116962759 A | * | 3/2023 |
| JP | WO2007126097 A1 | * | 9/2009 |

* cited by examiner

600 ↘

```
┌─────────────────────────────────────────────────────────────┐
│  ACCESS BLOCKCHAIN ASSOCIATED WITH TRACKING USER            │
│  ENGAGEMENT WITH FIRST CONTENT ITEM ACROSS INTERNET         │
│  RESOURCES ASSOCIATED WITH PLURALITY OF ENTITIES TO         │
│  IDENTIFY PLURALITY OF SETS OF FEEDBACK INFORMATION         │
│  COMPRISING FIRST SET OF FEEDBACK INFORMATION, SUBMITTED    │── 602
│  BY FIRST ENTITY OF PLURALITY OF ENTITIES, ASSOCIATED WITH  │
│  USER ENGAGEMENT WITH FIRST CONTENT ITEM VIA FIRST INTERNET │
│  RESOURCES ASSOCIATED WITH FIRST ENTITY, AND SECOND SET OF  │
│  FEEDBACK INFORMATION, SUBMITTED BY SECOND ENTITY OF        │
│  PLURALITY OF ENTITIES, ASSOCIATED WITH USER ENGAGEMENT     │
│  WITH FIRST CONTENT ITEM VIA SECOND INTERNET RESOURCES      │
│  ASSOCIATED WITH SECOND ENTITY                              │
└─────────────────────────────────────────────────────────────┘
                              │
                              ▼
┌─────────────────────────────────────────────────────────────┐
│  DETERMINE, BASED UPON PLURALITY OF SETS OF FEEDBACK        │
│  INFORMATION, FIRST AGGREGATED POPULARITY METRIC            │── 604
│  ASSOCIATED WITH FIRST CONTENT ITEM                         │
└─────────────────────────────────────────────────────────────┘
                              │
                              ▼
┌─────────────────────────────────────────────────────────────┐
│  STORE FIRST AGGREGATED POPULARITY METRIC IN BLOCKCHAIN     │── 606
└─────────────────────────────────────────────────────────────┘
```

FIG. 6

SYSTEM AND METHOD FOR LABELING AND PRESENTING CONTENT

BACKGROUND

Many services, such as websites, applications, etc. may provide platforms for viewing media. For example, a user may interact with a service. While interacting with the service, selected media may be presented to the user automatically.

SUMMARY

In accordance with the present disclosure, one or more computing devices and/or methods are provided. In an example, a first content item is provided for display on a first client device. A first feedback signal is received. The first feedback signal is indicative of one or more first user reactions to display of the first content item on the first client device. The first content item is provided for display on a second client device. A second feedback signal is received. The second feedback signal is indicative of one or more second user reactions to display of the first content item on the second client device. A first popularity score associated with the first content item is determined based upon the first feedback signal and the second feedback signal. A first popularity label is assigned to the first content item based upon the first popularity score. An enhanced content presentation interface comprising the first content item is generated based upon the first popularity label assigned to the first content item. A request for content associated with a third client device is received. In response to the request for content, the first content item is selected for presentation on the third client device. In response to selecting the first content item, the enhanced content presentation interface comprising the first content item is presented on the third client device.

In an example, a blockchain is accessed to identify a plurality of sets of feedback information. The blockchain is associated with tracking user engagement with a first content item across internet resources associated with a plurality of entities. The plurality of sets of feedback information comprise a first set of feedback information, submitted by a first entity of the plurality of entities, associated with user engagement with the first content item via first internet resources associated with the first entity. The plurality of sets of feedback information comprise a second set of feedback information, submitted by a second entity of the plurality of entities, associated with user engagement with the first content item via second internet resources associated with the second entity. Based upon the plurality of sets of feedback information, a first aggregated popularity metric associated with the first content item is determined. The first aggregated popularity metric is stored in the blockchain.

In an example, a first content item is provided for display on a first client device. A first feedback signal is received. The first feedback signal is indicative of one or more first user reactions to display of the first content item on the first client device. The first content item is provided for display on a second client device. A second feedback signal is received. The second feedback signal is indicative of one or more second user reactions to display of the first content item on the second client device. A first popularity score associated with the first content item is determined based upon the first feedback signal and the second feedback signal. A first popularity label is assigned to the first content item based upon the first popularity score. An enhanced content presentation interface comprising the first content item is generated based upon the first popularity label assigned to the first content item. The enhanced content presentation interface comprising the first content item is presented on a third client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 6 is a flow chart illustrating an example method for tracking aggregate popularity metrics associated with content items.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
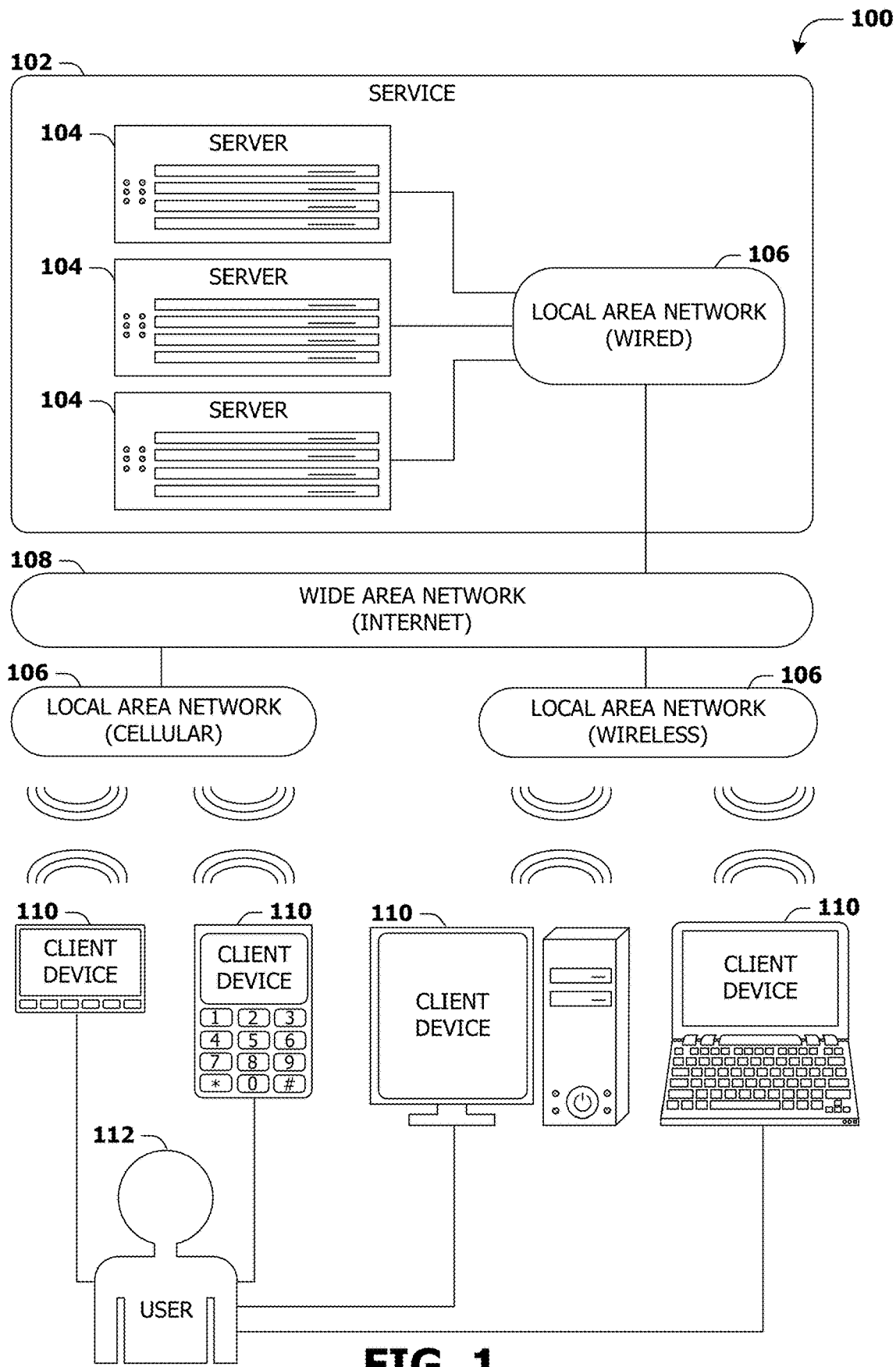
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
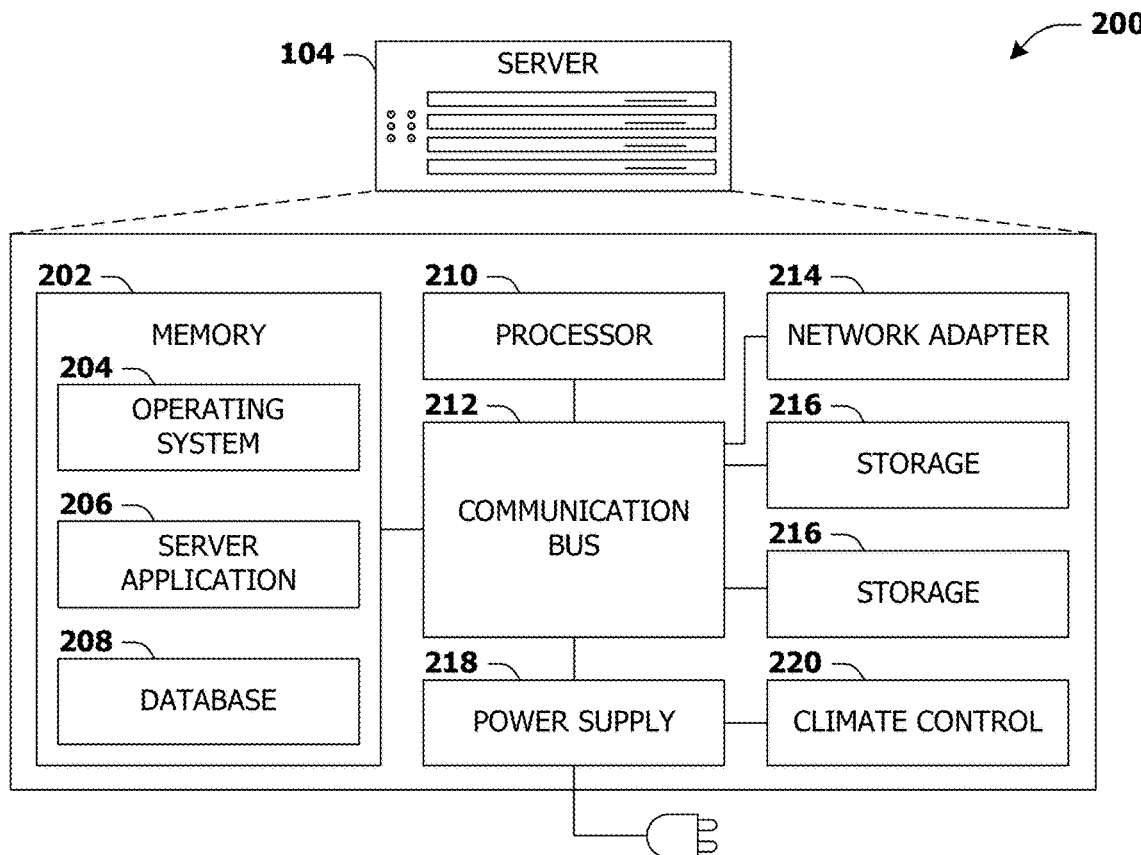
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
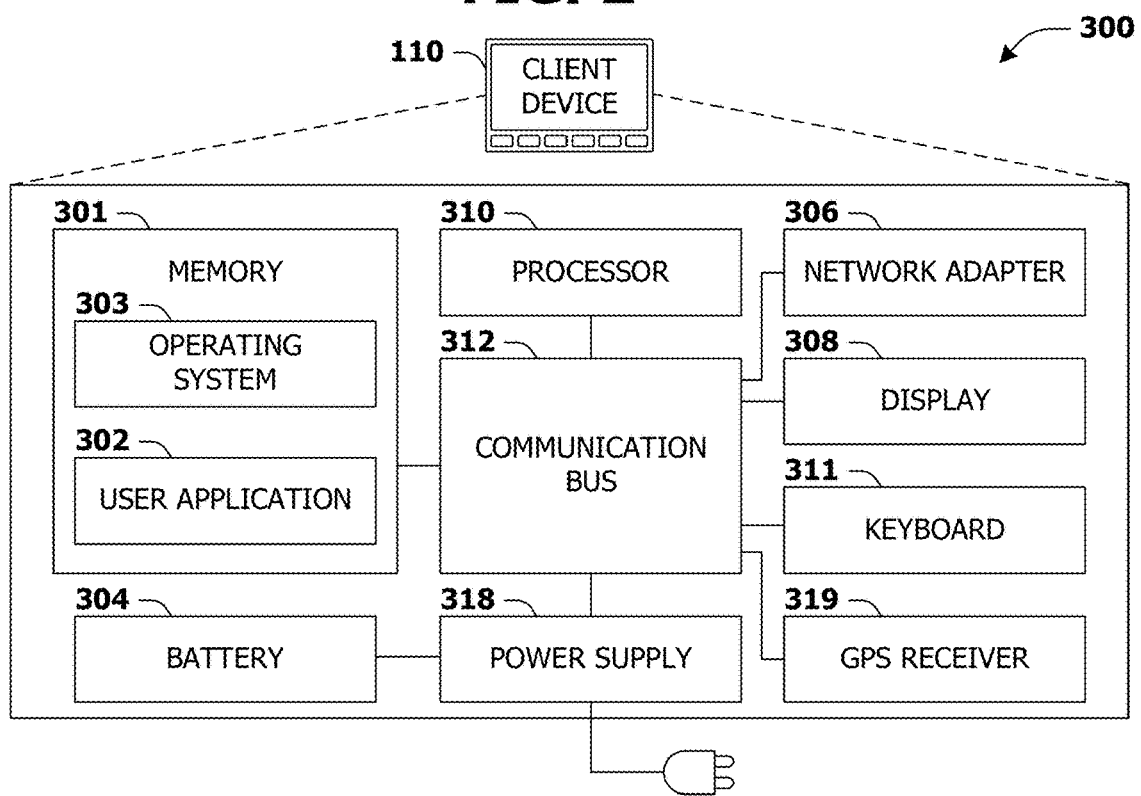
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for assigning popularity labels to content items and/or providing enhanced content presentation interfaces for presenting the content items are provided. For example, a user (and/or a device associated with the user) may access and/or interact with a service, such as a browser, software, a website, an application, an operating system, etc. that provides a platform for viewing content from a content system. In some examples, the content system may present a first content item (e.g. at least one of an advertisement a video, an article, an audio file, an image, a message, a link, etc.) to the user and/or other users. Feedback signals associated with user engagement with the first content item may be used to determine a popularity score associated with the first content item. A popularity label may be assigned to the first content item based upon the popularity score. Based upon the popularity label assigned to the first content item, the content system may generate an enhanced content presentation interface. The content system may use the enhanced content presentation interface to present the first content item when the popularity label is assigned to the first content item.

In some examples, the enhanced content presentation interface may display an indication (e.g., a graphical object, an icon, text, etc.) that the content system is popular. In some examples, one or more types of popularity labels may be assigned to the first content item 506, such as (i) an engaging popularity label, (ii) a ubiquity popularity label, (iii) a widespread engaging popularity label, (iv) a quirky popularity label, (v) a trending popularity label, and/or (vi) one or more other popularity labels. Different types of popularity labels may be reflective of different types of popularity of content. For example, the engaging popularity label may represent a high level of user engagement (e.g., content item selections, video completions, etc.) and/or positive user sentiment. Alternatively and/or additionally, the ubiquity popularity label may represent content having a wide reach among an audience (e.g., a large proportion of users of the audience have viewed the content) and/or a high frequency of views among the audience (e.g., a high quantity of presentations of the first content item). The enhanced content presentation interface may display an indication of the popularity label. Accordingly, a user presented with the first content item via the enhanced content item may be notified of a popularity (and/or type of popularity) of the first content item, which may enable the user to use this information to decide whether to engage with the first content item. For example, the user may decide to view an entirety of the first content item based upon the indication of the popularity label (e.g., the user may benefit from a social experience associated with viewing content that is currently popular among an audience).

In some examples, the enhanced content presentation interface may comprise a frame around the first content item that may exhibit an environment, such as at least one of a cinema stage (e.g., movie mode), a view of scenery (e.g., nature mode), etc., which may provide an improved user experience. The enhanced content presentation interface may be configured with one or more higher quality playback settings (e.g., increased resolution, increased bit rate, etc.) as compared to playback settings used to present the first content item when the popularity label is not assigned to the first content item. For example, the enhanced content presentation interface may be configured with the one or more higher quality playback settings based upon a measure of low to high resolution change events in which a resolution of playback of the first content item is increased (e.g., the measure of low to high resolution change events may indicate that most users prefer to watch the first content item with higher resolution).

Using one or more of the techniques provided herein, a plurality of entities (e.g., various websites, applications, etc. that present the first content item to users) may pool feedback information together using a blockchain. For example, the plurality of entities may each store feedback information associated with the first content item in the blockchain, which may be encrypted. In some examples, a content item popularity tracking system may (i) collect the feedback information (provided by the plurality of entities) stored in the blockchain, (ii) determine one or more aggregated metrics associated with the first content item based upon the feedback information, and/or (iii) store the one or more aggregated metrics in the blockchain. The plurality of entities may be authorized to access the one or more aggregated metrics in the blockchain. Thus, in accordance with one or more of the techniques presented herein, the blockchain may be used to provide accurate and/or verifiable metrics to the entities. The entities may use the metrics to assign popularity labels to content items and/or enhance presentation of the content items.

Figure 4:
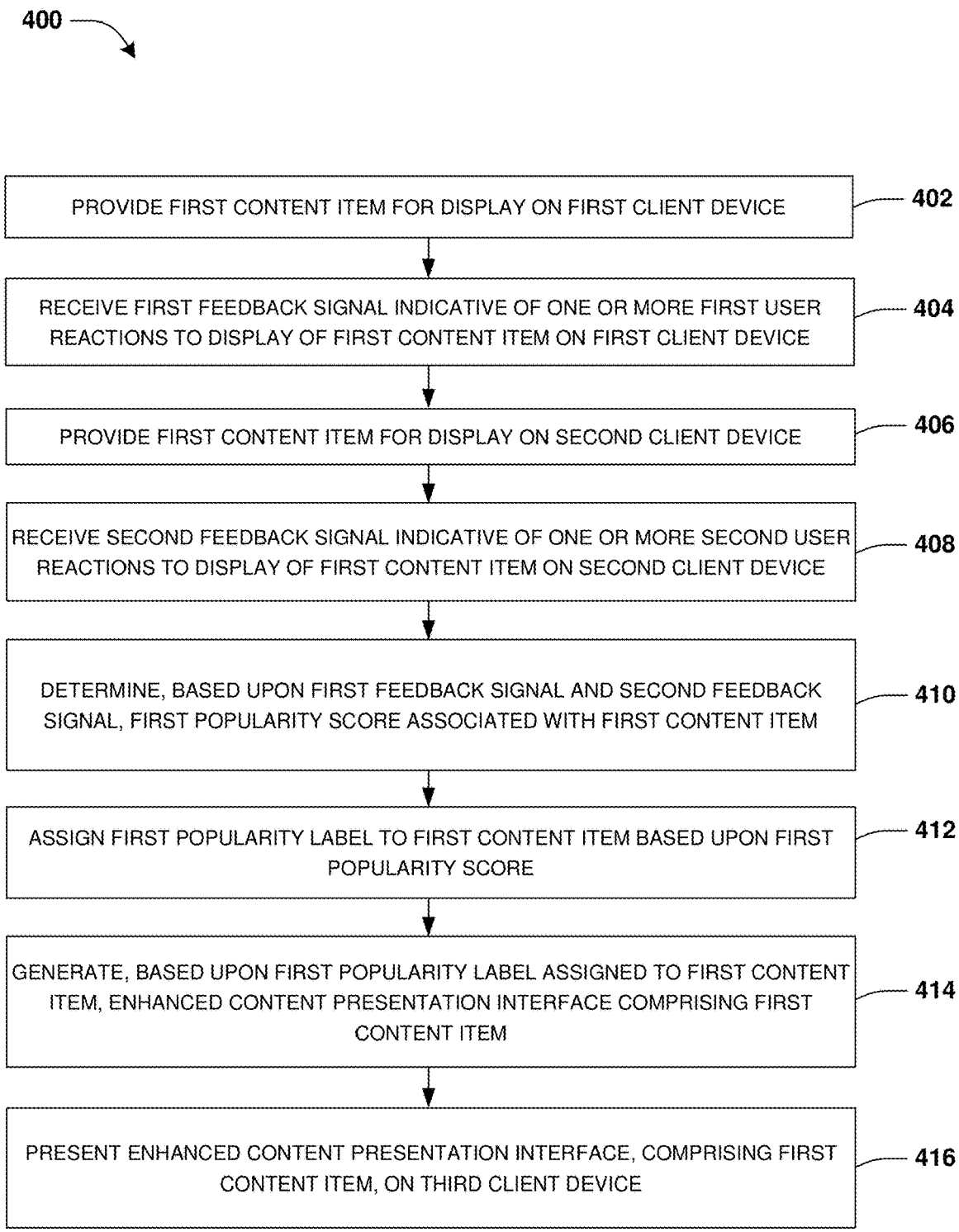
FIG. 4 is a flow chart illustrating an example method for assigning popularity labels to content items and/or providing enhanced content presentation interfaces for presenting the content items.

An embodiment of assigning popularity labels to content items and/or providing enhanced content presentation interfaces for presenting the content items is illustrated by an example method 400 of FIG. 4. In some examples, a content system is provided. The content system may be an advertisement system (e.g., an online advertising system). Alternatively and/or additionally, the content system may not be an advertisement system. In some examples, the content system may provide content items (e.g., advertisements, images, links, videos, etc.) to be presented via internet resources (e.g., at least one of web pages, applications, resources of a mobile application, resources of a web application, etc.) associated with the content system. For example, the internet resources may be associated with websites (e.g., websites providing search engines, email services, news content, communication services, etc.) associated with the content system. The content system may provide content items to be presented in (dedicated) locations throughout the internet resources (e.g., one or more areas of a web page configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to consume and/or interact with the content item before the user can access content of a web page, utilize resources of an application and/or play a game.

The content system may provide a first content item for display on client devices of users. The first content item may comprise at least one of a video, an article, an audio file, an image, a message, a link, etc. In some examples, the first content item may be an advertisement. In some examples, the first content item is provided by a first entity. The first entity may be an advertiser, a company, a brand, an organization, etc. The first content item may be associated with one or more products, one or more services, etc. associated with the first entity. The first entity may upload the first content item to the content system to be presented to users by the content system to promote and/or advertise the one or more products, one or more services, etc. associated with the first entity. For example, the first content item may be uploaded to the content system via an advertising service. The first content item may be associated with a content campaign for promoting a brand, an image, a product and/or a service associated with the first entity. In some examples, the first entity provides compensation based on for at least one of impression events of the first content item (e.g., in an impression event, the first content item is presented to a user by the content system), conversion events of the first content item (e.g., in a conversion event, the first content item is presented to a user by the content system, and the user performs an action related to the first content item after or while the content item is presented, such as a purchase of a product, a subscription to a service, etc.), etc.

A first user, such as user Jill, (and/or a first client device associated with the first user) may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

At 402, the content system may provide the first content item for display on the first client device. The first client device may comprise at least one of a laptop, a desktop computer, a phone, a computer, a wearable device, a smart device, a television, any other type of computing device, hardware, etc. For example, the content system may transmit the first content item to the first client device and/or display the first content item on a display of the first client device. In some examples, the first content item may be displayed via a first internet resource associated with the content system. In an example, the first internet resource may comprise a web page, and the first content item may be displayed in a serving area (e.g., dedicated serving area, such as dedicated advertisement serving area) of the web page. In some examples, the content system may provide the first content item for display on the first client device in response to receiving a request for content associated with the first client device.

Figure 5A:
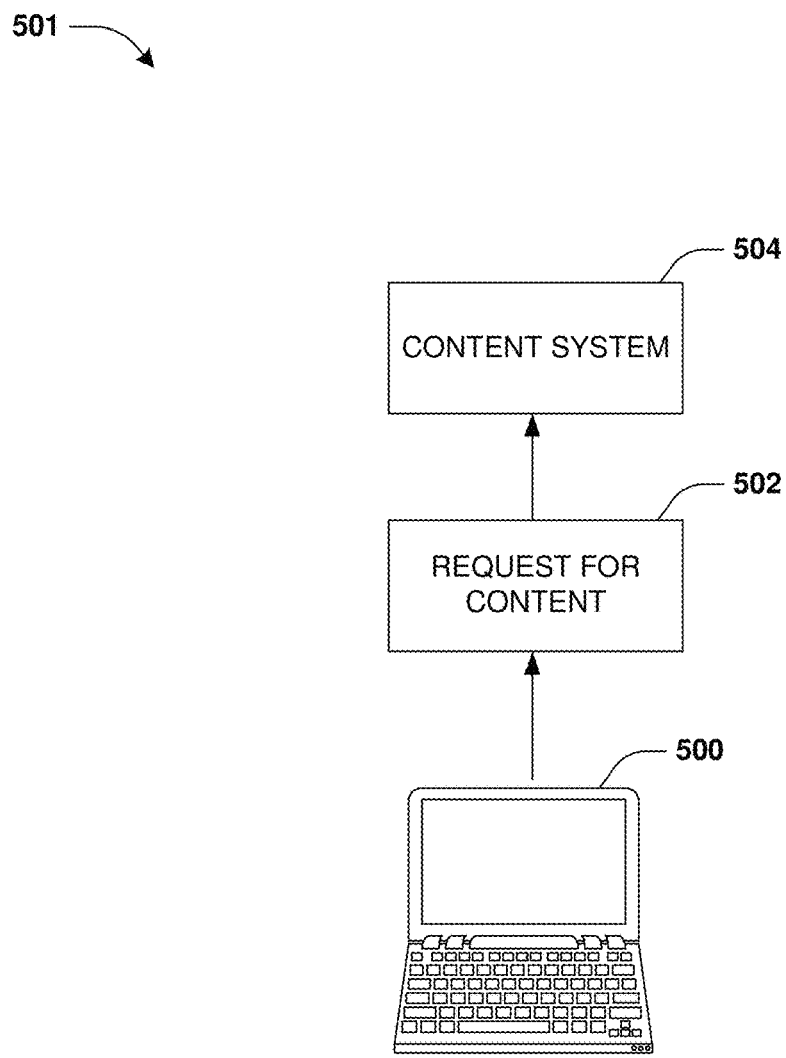
FIG. 5A is a component block diagram illustrating an example system for assigning popularity labels to content items and/or providing enhanced content presentation interfaces for presenting the content items, where a request for content associate with a first client device is received by a server associated with a content system.

FIGS. 5A-5K illustrate examples of an example system 501 for assigning popularity labels to content items and/or providing enhanced content presentation interfaces for presenting the content items, described with respect to the method 400 of FIG. 4. FIG. 5A illustrates a server 504 of the content system receiving the request for content (shown with reference number 502) associated with the first client device (shown with reference number 500). The request for content 502 may correspond to a request to be provided with one or more content items (e.g., advertisements, images, links, videos, etc.) for presentation via the first internet resource, such as in the serving area of the first internet resource. The first internet resource corresponds to at least one of a web page of a website associated with the content system, an application associated with the content system, an internet game associated with the content system, etc.

In some examples, the first client device 500 may transmit a request to access the first internet resource to a first server associated with the first internet resource. In response to receiving the request to access the first internet resource, the first server associated with the first internet resource may transmit first resource information associated with the first internet resource to the first client device 500. The first client device 500 may transmit the request for content 502 to the content system (e.g., to the server 504 of the content system) in response to receiving the first resource information. Alternatively and/or additionally, the first server associated with the first internet resource may transmit the request for content 502 to the content system in response to receiving the request to access the first internet resource.

In some examples, in response to receiving the request for content 502, the content system may perform a content selection process to select one or more content items to display on the first client device 500 (via the serving area of the first internet resource, for example). The content selection process may comprise selecting the first content item from among a plurality of content items (e.g., a plurality of content items participating in an auction associated with the request for content 502). In some examples, the first content item may be selected from among the plurality of content items (using the first user profile, for example) based upon a determination that the first user has an interest in the first content item. In some examples, the first content item may be selected from among the plurality of content items based upon the first user profile (e.g., the first content item may be selected from among the plurality of content items based upon a determination that the first user has an interest in the first content item). In some examples, the first content item may be selected from among the plurality of content items based upon a plurality of bid values associated with the plurality of content items. For example, the first content item may be selected from among the plurality of content items based upon a determination that a first bid value associated with the first content item is a highest bid value of the plurality of bid values.

Figure 5B:
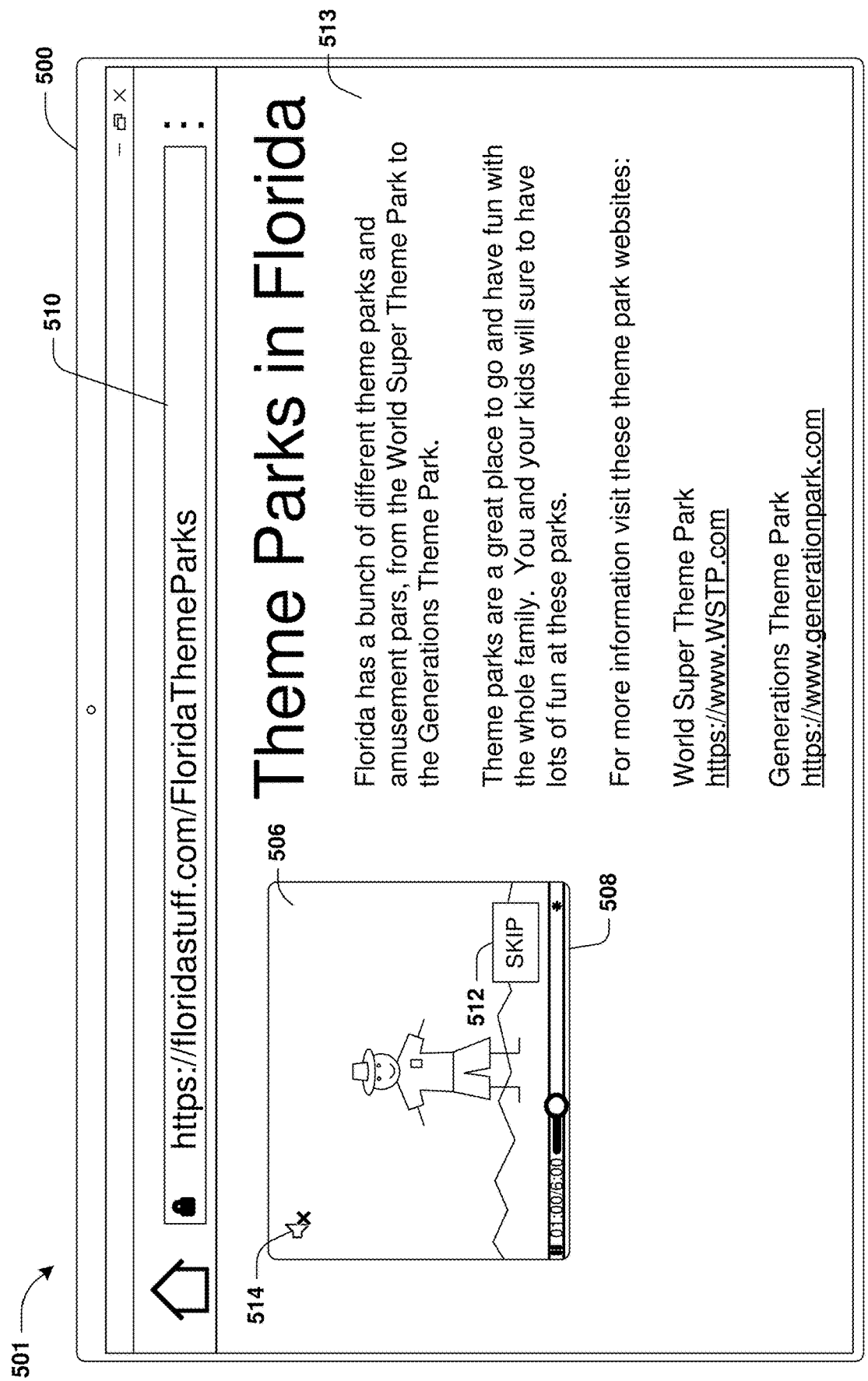
FIG. 5B is a component block diagram illustrating an example system for assigning popularity labels to content items and/or providing enhanced content presentation interfaces for presenting the content items, where a content item is presented on a first client device via a web page.

In some examples, in response to selecting the first content item, the first content item may be transmitted to the first client device 500. FIG. 5B illustrates the first client device 500 presenting and/or accessing the first internet resource, which may correspond to a web page 513. For example, the content system may provide the first content item (shown with reference number 506) to be presented via the web page 513 while the web page 513 is accessed by the first client device 500. In some examples, the first content item 506 comprises a first video (e.g., a video advertisement or other type of video) presented via a video player 508. Other types of content (e.g., an article, a link, a web page, an image, a virtual reality experience, etc.) of the first content item 506 are within the scope of the present disclosure.

In some examples, one or more interactive selectable inputs are displayed (for interacting with the first content item 506, for example). For example, the one or more interactive selectable inputs may comprise an unmute selectable input 514 (e.g., a sound unmute icon), a skip selectable input 512 and/or one or more selectable inputs for controlling at least one of a volume, a playback position, a resolution, a video presentation size, etc. of the first content item 506 (e.g., the first video). In some examples, audio of the first content item 506 may be muted when playback of the first content item 506 (e.g., the first video) starts. The audio may be unmuted in response to selecting the unmute selectable input 514. In response to a selection of the skip selectable input 512, the first content item 506 (e.g., the first video) may stop being presented (prior to completion of playback of the first content item 506, for example).

At 404 of FIG. 4, the content system may receive a first feedback signal indicative of one or more first user reactions to display of the first content item 506 on the first client device 500. In some examples, the first feedback signal may be received from the first client device 500. Alternatively and/or additionally, the first feedback signal may be received from the first server (and/or other server) associated with the first internet resource.

In some examples, the first feedback signal may be indicative of (i) whether the first content item 506 was presented on the first client device 500, (ii) an amount of time the first content item 506 was displayed on the first client device 500, (iii) an amount (e.g., a proportion) of the display of the first client device 500 that is occupied by the first content item 506 when the first content item 506 is displayed, (iv) an amount (e.g., a proportion) of the first content item 506 (e.g., the first video) that is presented via the first client device 500 (e.g., if the first video is 2 minutes long, and only 1 minute of the first video is played before the first video is closed, the first feedback signal may indicate that about 50% of the first video was presented on the first client device 500), (v) one or more presentation parameters comprising at least one of a resolution associated with presenting the first content item 506 (e.g., the first video), a bit rate associated with presenting the first content item 506 (e.g., the first video), a contrast level associated with presenting the first content item 506 (e.g., the first video), a brightness level associated with presenting the first content item 506 (e.g., the first video), a presentation size associated with presenting the first content item 506 (e.g., a video presentation size associated with presenting the first video, such as small view size, full screen size, a quantity of pixels, etc.), etc. (vi) a selection of the first content item 506 (e.g., a click on the first content item 506, which may redirect the first client device 500 to a different internet resource associated with the first entity), and/or (vii) one or more selections of one or more selectable inputs of the one or more interactive selectable inputs.

The one or more selections may comprise (i) a selection of the skip selectable input 512 to skip the first content item 506, (ii) a selection of the unmute selectable input 514 to unmute the audio of the first content item 506, (iii) a selection of a selectable input to change a setting associated with presentation of the first content item 506, such as at least one of a presentation size of the first content item 506 (e.g., switch from small view size to full screen size), a resolution of the first content item 506 (e.g., switch from a lower resolution such as 480p resolution to a higher resolution such as 4K resolution), a bit rate of the first content item 506, etc. and/or (iv) one or more other selections of one or more other selectable inputs of the one or more interactive selectable inputs.

At 406 of FIG. 4, the content system may provide the first content item 506 for display on a second client device (e.g., at least one of a laptop, a desktop computer, a phone, a computer, a wearable device, a smart device, a television, any other type of computing device, hardware, etc.). For example, the content system may provide the first content item 506 for display on the second client device using one or more of the techniques provided herein with respect to providing the first content item 506 for display on the first client device 500. In some examples, the content system may provide the first content item 506 for display on the first client device 500, the second client device and/or other client devices in association with the content campaign (associated with the first entity). In some examples, the first content item 506 may be displayed via a second internet resource (accessed by the second client device, for example). The second internet resource corresponds to at least one of a web page of a website associated with the content system, an application associated with the content system, an internet game associated with the content system, etc. The second internet resource may be the same as or different than the first internet resource.

At 408 of FIG. 4, the content system may receive a second feedback signal indicative of one or more second user reactions to display of the first content item 506 on the second client device. In some examples, the second feedback signal may be received from the second client device. Alternatively and/or additionally, the second feedback signal may be received from a second server associated with the second internet resource. In some examples, the second feedback signal may comprise one or more of the features, characteristics, etc. discussed herein with respect to the first feedback signal.

At 410 of FIG. 4, the content system may determine, based upon a plurality of feedback signals associated with the first content item 506, a first popularity score associated with the first content item 506. In some examples, the first popularity score may correspond to a level of popularity of the first content item 506. For example, a higher value of the first popularity score may correspond to a higher level of popularity of the first content item 506 among an audience (e.g., an audience of users to which the content system presented the first content item 506 in the first period of time). The plurality of feedback signals may comprise the first feedback signal the second feedback signal and/or other feedback signals associated with other presentation events of the first content item 506 in which the first content item 506 was provided for display on client devices. In some examples, the plurality of feedback signals may be associated with a first period of time (e.g., feedback signals of the plurality of feedback signals may be received in response to presentation events of the first content item 506 during the first period of time).

Figure 5C:
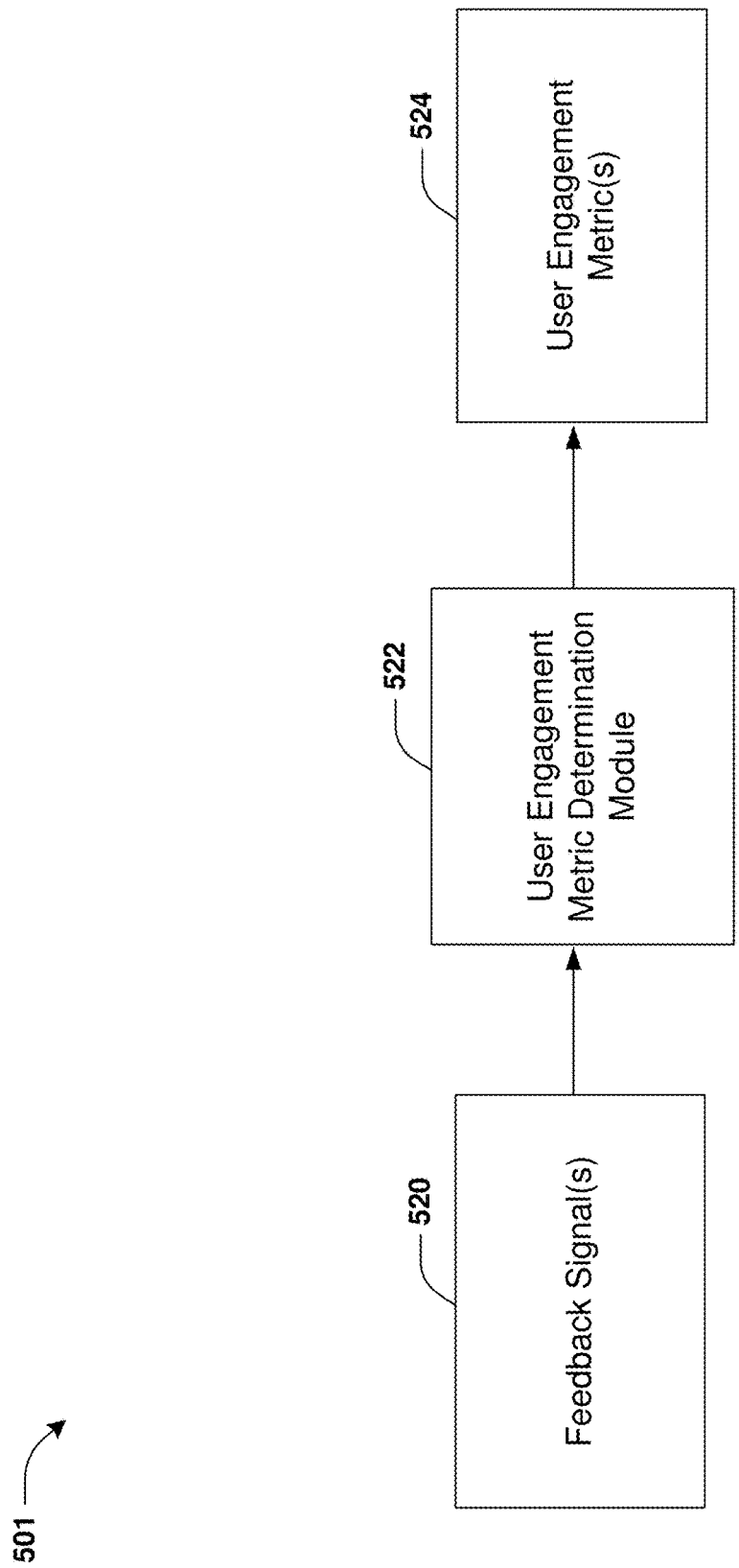
FIG. 5C is a component block diagram illustrating an example system for assigning popularity labels to content items and/or providing enhanced content presentation interfaces for presenting the content items, where a first set of user engagement metrics associated with a first content item is determined based upon feedback signals associated with the first content item.
Figure 5D:
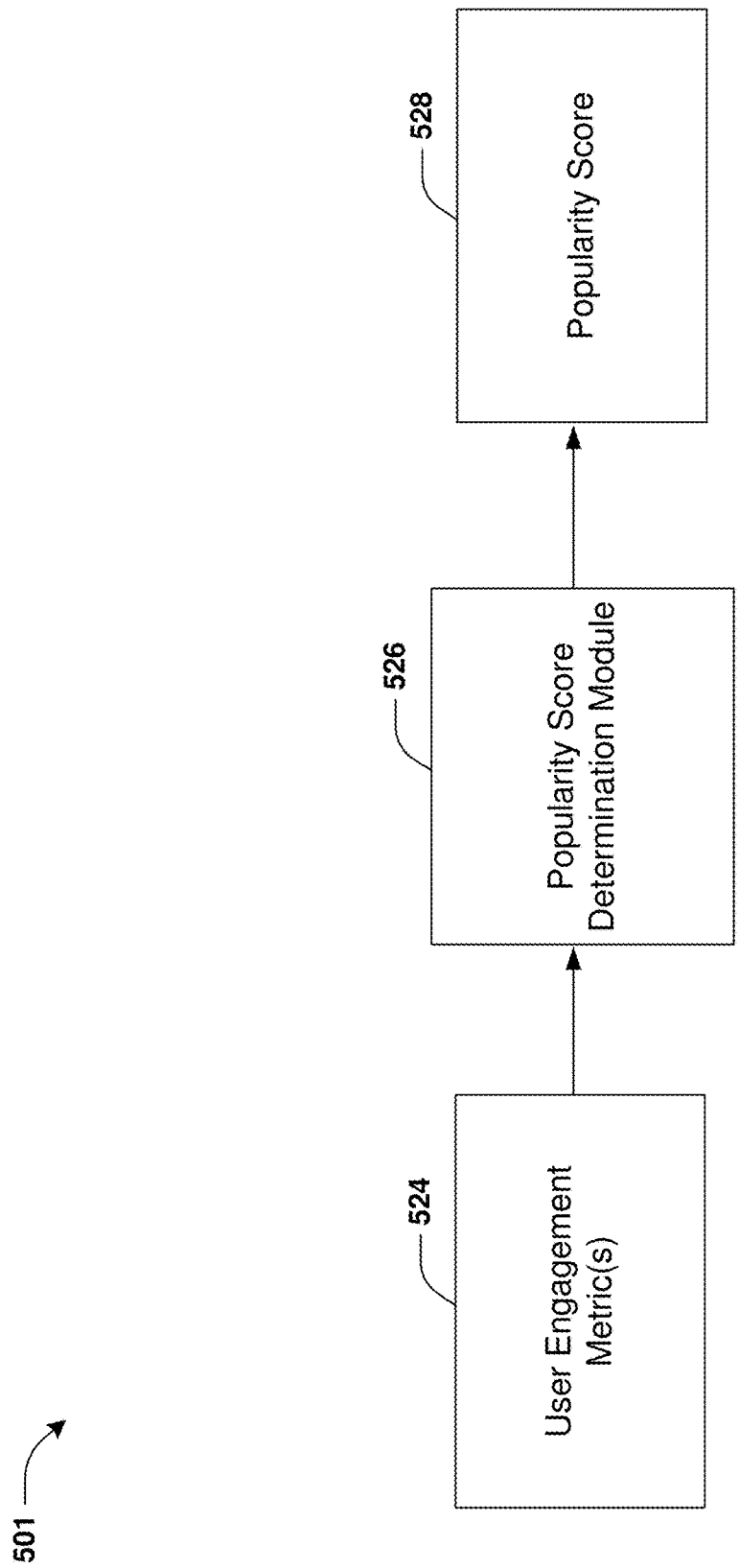
FIG. 5D is a component block diagram illustrating an example system for assigning popularity labels to content items and/or providing enhanced content presentation interfaces for presenting the content items, where a first popularity score associated with a first content item is determined based upon a first set of user engagement metrics associated with the first content item.

In some examples, the content system may determine a first set of (one or more) user engagement metrics associated with user engagement with the first content item 506. The content system may determine the first set of user engagement metrics based upon the plurality of feedback signals. The content system may determine the first popularity score based upon the first set of user engagement metrics associated with the first content item 506. FIG. 5C illustrates determination of the first set of user engagement metrics (shown with reference number 524). A user engagement metric determination module 522 may receive the plurality of feedback signals (shown with reference number 520) as input, and may use the plurality of feedback signals 520 to determine the first set of user engagement metrics 524. FIG. 5D illustrates determination of the first popularity score (shown with reference number 528). A popularity score determination module 526 may receive the first set of user engagement metrics 524 as input, and may use the first set of user engagement metrics 524 to determine the first popularity score 528.

In an example, the first set of user engagement metrics 524 may comprise a first measure of content item presentations (e.g., content item impressions, such as advertisement impressions) of the first content item 506 during the first period of time. For example, the first measure of content item presentations may be a measure of content item presentations of the first content item 506 via the content system during the first period of time. Alternatively and/or additionally, the first measure of content item presentations may be a measure of content item presentations of the first content item 506 via one or more first internet resources associated with the content system during the first period of time. The one or more first internet resources may comprise the first internet resource, the second internet resource and/or one or more other internet resources on which the content system presents one or more content items (e.g., advertisements and/or other content items) to users.

In some examples, the term "measure" and/or "metric" as used herein may correspond to a quantity, a rate, an average and/or other metric. For example, a measure of content item presentations may correspond to a quantity of content item presentations (e.g., a total quantity of content item presentations during the first period of time). Alternatively and/or additionally, the first measure of content item presentations may correspond to a rate of content item presentations of the first content item 506 per unit of time. In an example in which the unit of time is one day, the rate of content item presentations may correspond to an average quantity of content item presentations per day during the first period of time.

Alternatively and/or additionally, the first set of user engagement metrics 524 may comprise a first measure of content item selections (e.g., content item clicks, such as advertisement clicks) associated with the first content item 506 during the first period of time. For example, the first measure of content item selections may be a measure of selections of the first content item 506 in content item presentations performed via the content system (and/or the one or more first internet resources associated with the content system) during the first period of time.

Alternatively and/or additionally, the first set of user engagement metrics 524 may comprise a first measure of video starts (e.g., video start engagements) associated with the first content item 506 (e.g., the first video) during the first period of time. For example, the first measure of video starts may be a measure of video start engagements of the first video in content item presentations performed via the content system (and/or the one or more first internet resources associated with the content system) during the first period of time. A video start (e.g., a video start engagement) may correspond to playback of the first video being started after the content system provides the first video for display on a client device.

Alternatively and/or additionally, the first set of user engagement metrics 524 may comprise a first measure of video completions (e.g., video completion engagements) associated with the first content item 506 (e.g., the first video) during the first period of time. For example, the first measure of video completions may be a measure of video completion engagements of the first video in content item presentations performed via the content system (and/or the one or more first internet resources associated with the content system) during the first period of time. A video completion (e.g., a video completion engagement) may correspond to playback of the first video being completed (e.g., at least a threshold proportion, such as 90%, 95%, 97%, 100% or other proportion, of the first video is played via the video player 508).

Alternatively and/or additionally, the first set of user engagement metrics 524 may comprise a first measure of events in which a first proportion of the first video (e.g., at least one of 25% the first video, 50% the first video, 75% the first video, etc.) is presented during the first period of time. For example, the first measure of events may be a measure of events in which at least the first proportion of the first video is presented in content item presentations performed via the content system (and/or the one or more first internet resources associated with the content system) during the first period of time.

Alternatively and/or additionally, the first set of user engagement metrics 524 may comprise a second measure of events in which a second proportion of the first video (different than the first proportion, for example) is presented during the first period of time. For example, the second measure of events may be a measure of events in which at least the second proportion of the first video is presented in content item presentations performed via the content system (and/or the one or more first internet resources associated with the content system) during the first period of time.

Alternatively and/or additionally, the first set of user engagement metrics 524 may comprise a first measure of video playback of the first video in content item presentations during the first period of time. For example, the first measure of video playback may be correspond to an average (e.g., mean, median, etc.) amount of the first video that is played in a content item presentation of the first content item 506 during the first period of time. For example, the first measure of video playback may indicate that the average user that was shown the first video by the content system watched about 53% of the first video.

Alternatively and/or additionally, the first set of user engagement metrics 524 may comprise a first measure of skip events in which the first content item 506 (e.g., the first video) is skipped (via the skip selectable input 512, for example) in content item presentations during the first period of time. For example, the first measure of skip events may be a measure of events in which the first content item 506 is skipped in content item presentations performed via the content system (and/or the one or more first internet resources associated with the content system) during the first period of time.

Alternatively and/or additionally, the first set of user engagement metrics 524 may comprise a first measure of high resolution events in which the first content item 506 (e.g., the first video) is played with a resolution greater than a threshold resolution (e.g., greater than 720p resolution in content item presentations during the first period of time. Alternatively and/or additionally, the first set of user engagement metrics 524 may comprise a first measure of low to high resolution change events in which a resolution of playback of the first video is increased (e.g., from 480p resolution to 1080p or 4K resolution) in response to a user request during the first period of time.

Alternatively and/or additionally, the first set of user engagement metrics 524 may comprise a first measure of unmute events in which audio of the first content item 506 (e.g., the first video) is unmuted (via the unmute selectable input 514, for example) in content item presentations during the first period of time. For example, the first measure of unmute events may be a measure of events in which the audio of the first content item 506 is unmuted in content item presentations performed via the content system (and/or the one or more first internet resources associated with the content system) during the first period of time.

Alternatively and/or additionally, the first set of user engagement metrics 524 may comprise a third measure of events in which the first video starts playback unmuted and a user does not mute the audio of the first video in content item presentations during the first period of time. Alternatively and/or additionally, the first set of user engagement metrics 524 may comprise a first measure of mute events in which a user mutes the audio of the first video in content item presentations during the first period of time. Alternatively and/or additionally, the first set of user engagement metrics 524 may comprise a measure of reaction events in which a user submits (e.g., publicly or privately posts) a reaction, such as a like, a dislike, a rating (e.g., 4 out of 5 star rating), a review, a complaint, etc. to the first content item 506 in content item presentations during the first period of time. Alternatively and/or additionally, the first set of user engagement metrics 524 may comprise a measure of share events in which the first content item 506 is shared (e.g., the first content item 506 may be shared by at least one of posting a social media post associated with the first content item 506, sending an email associated with the first content item 506, etc.).

Alternatively and/or additionally, the first set of user engagement metrics 524 may comprise one or more first audience-level metrics associated with a first audience of the first content item 506. In an example, the first audience may correspond to a first group of users that share one or more features, such as at least one of a first demographic (e.g., at least one of location, age, occupation etc.), a first interest, etc. In some examples, the one or more first audience-level metrics comprise a first audience-level measure of content item presentations associated with the first audience (determined using one or more of the techniques provided herein with respect to determining the first measure of content item presentations), a first audience-level measure of content item selections associated with the first audience, a first audience-level measure of video starts associated with the first audience, and/or other metrics (e.g., metrics similar to at least some of the first set of user engagement metrics 524 provided herein). Alternatively and/or additionally, the one or more first audience-level metrics may comprise a first measure of users of the first audience that viewed the first content item 506 (e.g., the first measure of users may correspond to a proportion of users in the first audience that viewed the first content item 506). In an example, the first measure of users corresponds to 40%, which may indicate that 40% of users of the first audience viewed the first content item 506. Alternatively and/or additionally, the one or more first audience-level metrics may comprise a measure of presentations of the first content item 506 to users of the first audience (e.g., how many times the first content item 506 was shown to users of the first audience during the first period of time). Alternatively and/or additionally, the one or more first audience-level metrics may comprise a second measure of users of the first audience that viewed the first content item 506 multiple times (e.g., the first measure of users may correspond to a proportion of users in the first audience that viewed the first content item 506 multiple times).

Alternatively and/or additionally, the first set of user engagement metrics 524 may comprise one or more second audience-level metrics associated with a second audience of the first content item 506. In an example, the second audience may correspond to a second group of users that share one or more features, such as at least one of a second demographic (e.g., at least one of location, age, occupation etc.), a second interest, etc. In some examples, the one or more second audience-level metrics comprise a second audience-level measure of content item presentations associated with the second audience, a second audience-level measure of content item selections associated with the second audience, a second audience-level measure of video starts associated with the second audience, and/or other metrics. Alternatively and/or additionally, the one or more second audience-level metrics may comprise a third measure of users of the second audience that viewed the first content item 506 (e.g., the third measure of users may correspond to a proportion of users in the second audience that viewed the first content item 506). Alternatively and/or additionally, the one or more second audience-level metrics may comprise a measure of presentations of the first content item 506 to users of the second audience (e.g., how many times the first content item 506 was shown to users of the second audience during the first period of time). Alternatively and/or additionally, the one or more second audience-level metrics may comprise a fourth measure of users of the second audience that viewed the first content item 506 multiple times (e.g., the second measure of users may correspond to a proportion of users in the second audience that viewed the first content item 506 multiple times).

Alternatively and/or additionally, the first set of user engagement metrics 524 may comprise one or more polling metrics based upon polling signals received from users to which the first content item 506 is presented. For example, the content system may provide a polling interface for display on a client device in conjunction with providing the first content item 506 for display on the client device. The polling interface may be displayed after and/or while displaying the first content item 506. The polling interface may comprise one or more feedback selectable inputs associated with submitting feedback. In some examples, the one or more feedback selectable inputs comprise (i) a selectable input associated with submitting positive feedback (indicative of positive user sentiment towards the first content item 506, for example), (ii) a selectable input associated with submitting negative feedback (indicative of negative user sentiment towards the first content item 506, for example) and/or (ii) one or more other selectable inputs. In some examples, the one or more polling metrics comprise a measure of polling signals (e.g., a total quantity of polling signals received by the content system for the first content item 506 during the first period of time), a measure of positive polling signals (e.g., a quantity of polling signals indicating positive user sentiment towards the first content item 506), a measure of negative polling signals (e.g., a quantity of polling signals indicating negative user sentiment towards the first content item 506), and/or one or more other metrics.

In some examples, the first set of user engagement metrics 524 may comprise one or more first combined metrics. In some examples, a combined metric of the one or more first combined metrics (and/or each combined metric of the one or more first combined metrics) may be determined based upon at least two metrics of the first set of user engagement metrics 524, such as at least two of the first measure of content item presentations, the first measure of content item selections, the first measure of video starts, the first measure of video completions, the first measure of events, the second measure of events, the first measure of video playback, the first measure of unmute events, the third measure of events, the one or more first audience-level metrics, the one or more second audience-level metrics, etc.

In some examples, a combined metric of the one or more first combined metrics (and/or each combined metric of the one or more first combined metrics) may be determined by combining a metric of a first type and a metric of a second type. For example, one or more operations (e.g., mathematical operations) may be performed using the metric of the first type and the metric of the second type to determine the combined metric. In an example, the combined metric may be based upon and/or equal to a ratio of the metric of the first type to the metric of the second type (or a ratio of the metric of the second type to the metric of the first type). Alternatively and/or additionally, the combined metric may be based upon and/or equal to the metric of the first type divided by the metric of the second type (or the metric of the second type divided by the metric of the first type). One or more operations (e.g., mathematical operations) may be performed using the metric of the first type and the metric of the second type to determine the combined metric. In an example, the combined metric may be based upon and/or equal to a ratio of the metric of the first type to the metric of the second type (or a ratio of the metric of the second type to the metric of the first type). Alternatively and/or additionally, the combined metric may be based upon and/or equal to the metric of the first type divided by the metric of the second type (or the metric of the second type divided by the metric of the first type).

In an example, a first combined metric of the one or more first combined metrics may be determined based upon the first measure of video starts and the first measure of video completions. In an example, the first combined metric may be based upon and/or equal to a ratio of the first measure of video completions to the first measure of video starts (or a ratio of the first measure of video starts to the first measure of video completions). Alternatively and/or additionally, the first combined metric may be based upon and/or equal to the first measure of video completions divided by the first measure of video starts (or the first measure of video starts divided by the first measure of video completions). Accordingly, in some examples, the first combined metric may correspond to a measure of video completions (e.g., video completions of the first video) per video starts (e.g., video starts of the first video).

In an example, a second combined metric of the one or more first combined metrics may be determined based upon the first measure of video starts and the first measure of events in which the first proportion of the first video is presented. In an example, the second combined metric may be based upon and/or equal to a ratio of the first measure of video starts to the first measure of events (or a ratio of the first measure of events to the first measure of video starts). Alternatively and/or additionally, the second combined metric may be based upon and/or equal to the first measure of video starts divided by the first measure of events (or the first measure of events divided by the first measure of video starts).

In an example, a third combined metric of the one or more first combined metrics may be determined based upon the first measure of video starts and the second measure of events in which the second proportion of the first video is presented. In an example, the third combined metric may be based upon and/or equal to a ratio of the first measure of video starts to the second measure of events (or a ratio of the second measure of events to the first measure of video starts). Alternatively and/or additionally, the third combined metric may be based upon and/or equal to the first measure of video starts divided by the second measure of events (or the second measure of events divided by the first measure of video starts).

In an example, the first proportion may be 25%, the second proportion may be 75%, the first combined metric may correspond to 0.5, the second combined metric may correspond to 0.8 and/or the third combined metric may correspond to 0.6. For example, the first combined metric may indicate that about 50% of presentations of the first video were associated with complete playback of the first video (e.g., about 50% of users who started watching the first video completed the first video). The second combined metric may indicate that about 80% of presentations of the first video were associated with playing at least 25% of the first video (e.g., about 80% of users who started watching the first video watched at least 25% of the first video). The third combined metric may indicate that about 60% of presentations of the first video were associated with playing at least 75% of the first video (e.g., about 60% of users who started watching the first video watched at least 75% of the first video).

In an example, a fourth combined metric of the one or more first combined metrics may be determined based upon the first measure of content item presentations and the first measure of content item selections. In an example, the fourth combined metric may be based upon and/or equal to a ratio of the first measure of content item presentations to the first measure of content item selections (or a ratio of the first measure of content item selections to the first measure of content item presentations). Alternatively and/or additionally, the fourth combined metric may be based upon and/or equal to the first measure of content item presentations divided by the first measure of content item selections (or the first measure of content item selections divided by the first measure of content item presentations). Accordingly, in some examples, the fourth combined metric may correspond to a measure of content item selections (e.g., user selections of the first content item 506) per content item presentations (e.g., content item presentations of the first content item 506). In an example, the fourth combined metric may correspond to a click-through rate associated with the first content item 506.

In some examples, one or more operations (e.g., mathematical operations) may be performed using one, some and/or all metrics of the first set of user engagement metrics 524 to determine the first popularity score 528 associated with the first content item 506. In some examples, the first popularity score 528 may be a function of one, some and/or all metrics of the first set of user engagement metrics 524 and/or other metrics, parameters and/or features.

In some examples, a metric of the first set of user engagement metrics 524 may be reflective of a user sentiment and/or a level of user engagement towards the first content item 506. In some examples, a metric of the first set of user engagement metrics 524 meeting (e.g., exceeding) a threshold metric may indicate positive user sentiment and/or a higher level of user engagement towards the first content item 506 and/or the combined metric not meeting a threshold combined metric may indicate negative user sentiment and/or a lower level of user engagement towards the first content item 506.

In some examples, a first user sentiment score and/or a first user engagement score associated with the first content item 506 may be determined based upon the first set of user engagement metrics 524. In some examples, the first popularity score 528 is determined based upon the first user sentiment score and/or the first user engagement score. In some examples, a higher value of the first user sentiment score may be reflective of positive user sentiment towards the first content item 506 and/or a lower value of the first user sentiment score may be reflective of negative user sentiment towards the first content item 506. In some examples, a higher value of the first user engagement score may be reflective of a higher level of user engagement towards the first content item 506 and/or a lower value of the first user engagement score may be reflective of a lower level of user engagement towards the first content item 506.

In an example, the first user sentiment score may be determined based upon the first measure of content item selections and/or the fourth combined metric (e.g., the click-through rate) associated with the first content item 506. A higher value of the first measure of content item selections and/or a higher value of the fourth combined metric (e.g., the click-through rate) may be reflective of more users selecting the first content item 506 (due to the users having positive sentiment towards the first content item 506, for example). A higher value of the first measure of content item selections and/or a higher value of the fourth combined metric (e.g., the click-through rate) may thus correspond to a higher value of the first user sentiment score.

In an example, the first user sentiment score may be determined based upon the first measure of video completions associated with the first content item 506. A higher value of the first measure of video completions may be reflective of more users viewing an entirety of the first content item 506 (due to the users having positive sentiment towards the first content item 506, for example). A higher value of the first measure of video completions may thus correspond to a higher value of the first user sentiment score.

In an example, the first user sentiment score may be determined based upon the first measure of skip events associated with the first content item 506. A higher value of the first measure of skip events may be reflective of more users skipping the first content item 506 (due to the users having negative sentiment towards the first content item 506, for example). A higher value of the first measure of skip events may thus correspond to a lower value of the first user sentiment score.

In an example, the first user sentiment score may be determined based upon the first measure of unmute events associated with the first content item 506. A higher value of the first measure of unmute events may be reflective of more users unmuting audio of the first content item 506 (due to the users having positive sentiment towards the first content item 506, for example). A higher value of the first measure of unmute events may thus correspond to a higher value of the first user sentiment score.

In an example, the first user sentiment score may be determined based upon the third measure of events in which the first video starts playback unmuted and a user does not mute the audio of the first video. A higher value of the third measure of events may be reflective of more users not muting audio of the first content item 506 (due to the users having positive sentiment towards the first content item 506, for example). A higher value of the third measure of events may thus correspond to a higher value of the first user sentiment score.

In an example, the first user sentiment score may be determined based upon the first measure of mute events associated with the first content item 506. A higher value of the first measure of mute events may be reflective of more users muting audio of the first content item 506 (due to the users having negative sentiment towards the first content item 506, for example). A higher value of the first measure of mute events may thus correspond to a lower value of the first user sentiment score.

In an example, the first user sentiment score may be determined based upon the first measure of high resolution events and/or the first measure of low to high resolution change events associated with the first content item 506. A higher value of the first measure of high resolution events and/or a higher value of the first measure of low to high resolution change events may be reflective of more users viewing the first content item 506 with higher resolutions than the threshold resolution (due to the users having positive sentiment towards the first content item 506, for example). A higher value of the first measure of high resolution events and/or a higher value of the first measure of low to high resolution change events may thus correspond to a higher value of the first user sentiment score.

In an example, the first user sentiment score may be determined based upon the first combined metric associated with the first content item 506. In an example, the first combined metric may correspond to 0.3, which may indicate that the first video is played completely in about 30% of content item presentations in which playback of the first video is started. A higher value of the first combined metric may correspond to a higher value of the first user sentiment score.

In some examples, the first user sentiment score may be determined based upon one or more other metrics (e.g., the one or more polling metrics, the one or more first combined metrics, etc.) of the first set of user engagement metrics 524 discussed herein.

In an example, the first user engagement score may be determined based upon the first measure of content item selections, the first measure of video completions, the first measure of events (in which the first proportion of the first video is presented), the second measure of events (in which the second proportion of the first video is presented), the first measure of video playback, the first measure of low to high resolution change events, the first measure of unmute events, the third measure of events, the measure of reaction events, the measure of share events, and/or one or more other metrics. In an example, a higher value of at least one of the first measure of content item selections, the first measure of video completions, the first measure of events, the second measure of events, the first measure of video playback, the first measure of low to high resolution change events, the first measure of unmute events, the third measure of events, the measure of reaction events, the measure of share events, etc. may be reflective of a higher level of user engagement with the first content item 506, and thus may correspond to a higher value of the first user engagement score.

In some examples, one or more operations (e.g., mathematical operations) may be performed using the first user sentiment score and/or the first user engagement score to determine the first popularity score 528 associated with the first content item 506. In some examples, the first popularity score 528 may be a function of the first user sentiment score, where a higher value of the first user sentiment score may correspond to a higher value of the first popularity score 528. In some examples, the first popularity score 528 may be a function of the first user engagement score, where a higher value of the first user engagement score may correspond to a higher value of the first popularity score 528.

At 412 of FIG. 4, the content system assigns a first popularity label to the first content item 506 based upon the first popularity score 528. In some examples, the content system compares the first popularity score 528 with a threshold popularity score. The content system may assign the first popularity label to the first content item 506 based upon the first popularity score 528 meeting (e.g., exceeding) the threshold popularity score.

In some examples, a plurality of popularity labels may be used for labeling various content items associated with the content system. In some examples, each popularity label of the plurality of popularity labels may be associated with a set of (one or more) conditions. In an example, the plurality of popularity labels may comprise (i) an engaging popularity label, (ii) a ubiquity popularity label, (iii) a widespread engaging popularity label, (iv) a quirky popularity label, (v) a trending popularity label, and/or (vi) one or more other popularity labels.

In some examples, one or more of the plurality of popularity labels may be assigned to the first content item 506. In some examples, the first popularity label (assigned to the first content item 506) is a popularity label of the plurality of popularity labels.

In some examples, the engaging popularity label may be assigned to a content item that is associated with a relatively high level of user engagement and/or a positive user sentiment. In some examples, the engaging popularity label may be assigned to the first content item 506 based upon (i) the first user engagement score (which may be reflective of a level of positive user engagement towards the first content item 506, for example) meeting (e.g., exceeding) a first threshold user engagement score and/or (ii) a negative user engagement score associated with the first content item 506 not meeting (e.g., not exceeding) a threshold negative user engagement score. In some examples, the negative user engagement score may correspond to a level of negative user engagement towards the first content item 506. In some examples, the negative user engagement score may be determined based upon the first measure of skip events, the first measure of mute events, and/or a measure of events in which the first content item 506 is closed and/or clicked away from.

In some examples, the ubiquity popularity label may be assigned to a content item that that was viewed at least once by a relatively large proportion of an audience and/or that was viewed multiple times by a relatively large proportion of the audience that viewed the content item multiple times. In some examples, the ubiquity popularity label may be assigned to the first content item 506 based upon the first measure of content item presentations (e.g., content item impressions), the first measure of video starts, one or more gross rating points (GRPs) associated with the first content item 506 (e.g., the first video), a measure of users (e.g., unique users) that have viewed the first content item 506, and/or one or more other metrics. In an example, a ubiquity popularity score may be determined based upon the first measure of content item presentations, the first measure of video starts, the one or more GRPs associated with the first content item 506 (e.g., the first video), the measure of users (e.g., unique users) that have viewed the first content item 506, and/or the one or more other metrics. The ubiquity popularity label may be assigned to the first content item 506 based upon the ubiquity popularity score. For example, the ubiquity popularity label may be assigned to the first content item 506 based upon the ubiquity popularity score meeting (e.g., exceeding) a threshold ubiquity popularity score.

In some examples, the widespread engaging popularity label may be assigned to a content item that that is engaging and ubiquitous. In some examples, the widespread engaging popularity label may be assigned to the first content item 506 based upon (i) the ubiquity popularity score meeting (e.g., exceeding) the threshold ubiquity popularity score, (ii) the first user engagement score meeting (e.g., exceeding) the first threshold user engagement score and/or (iii) the negative user engagement score not meeting (e.g., not exceeding) the threshold negative user engagement score.

In some examples, the trending popularity label may be assigned to a content item with an increasing level of user engagement and/or ubiquity (among an audience, for example). In some examples, the trending popularity label may be assigned to the first content item 506 based upon (i) the ubiquity popularity score increasing over time (e.g., the content system determines different values of the ubiquity popularity score based on user activity in various periods of time, and identifies an increase of the ubiquity popularity score over the different values), (ii) a first rate of increase of the ubiquity popularity score meeting (e.g., exceeding) a first threshold rate of increase (e.g., the first threshold rate of increase may be based on rates of increase of ubiquity popularity scores of other content items other than the first content item 506, such that the first rate of increase of the ubiquity popularity score meeting the first threshold rate of increase may indicate that the first rate of increase of the ubiquity popularity score associated with the first content item 506 is greater than rates of increases of other ubiquity popularity scores associated with other content items), (iii) the first user engagement score increasing over time (e.g., the content system determines different values of the first user engagement score based on user activity in various periods of time, and identifies an increase of the first user engagement score over the different values) and/or (iv) a second rate of increase of the first user engagement score meeting (e.g., exceeding) a second threshold rate of increase (e.g., the second threshold rate of increase may be based on rates of increase of user engagement scores of other content items other than the first content item 506, such that the second rate of increase of the first user engagement score meeting the second threshold rate of increase may indicate that the second rate of increase of the first user engagement score associated with the first content item 506 is greater than rates of increases of other user engagement scores associated with other content items).

In some examples, the plurality of popularity labels may comprise audience-level popularity labels. In some examples, the audience-level popularity labels may comprise a first set of (one or more) audience-level popularity labels associated with the first audience, a second set of (one or more) audience-level popularity labels associated with the second audience, and/or other audience-level popularity labels associated with other audiences. In some examples, the first set of audience-level popularity labels may comprise (i) a first audience-level engaging popularity label, (ii) a first audience-level ubiquity popularity label, (iii) a first audience-level widespread engaging popularity label, (iv) a first audience-level trending popularity label, and/or (v) one or more other audience-level popularity labels. In some examples, whether to assign a label of the first set of audience-level popularity labels to a content item may be determined based upon the first set of user engagement metrics 524, such as the one or more first audience-level metrics associated with the first audience and/or other metrics of the first set of user engagement metrics 524. Whether to assign a label of the first set of audience-level popularity labels to a content item may be determined using one or more of the techniques provided herein with respect to determining whether to assign the engaging popularity label, the ubiquity popularity label, the widespread engaging popularity label and/or the trending popularity label to a content item.

In an example, the first audience-level ubiquity popularity label (of the first set of audience-level popularity labels associated with the first audience) may be assigned to a content item that was viewed at least once by a relatively large proportion of the first audience and/or was viewed multiple times by a relatively large proportion of the first audience. In some examples, the first audience-level ubiquity popularity label may be assigned to the first content item 506 based upon the first audience-level measure of content item presentations (e.g., content item impressions among users of the first audience), the first audience-level measure of video starts, one or more GRPs associated with presentation of the first content item 506 (e.g., the first video) to users of the first audience, a measure of users (e.g., unique users) of the first audience that have viewed the first content item 506, and/or one or more other metrics. In an example, an audience-level ubiquity popularity score may be determined based upon the first audience-level measure of content item presentations, the first audience-level measure of video starts, the one or more GRPs associated with the first content item 506 (e.g., the first video) to users of the first audience, the measure of users (e.g., unique users) of the first audience that have viewed the first content item 506, and/or the one or more other metrics. The first audience-level ubiquity popularity label may be assigned to the first content item 506 based upon the audience-level ubiquity popularity score. For example, the first audience-level ubiquity popularity label may be assigned to the first content item 506 based upon the audience-level ubiquity popularity score meeting (e.g., exceeding) a threshold audience-level ubiquity popularity score.

In some examples, the quirky popularity label may be assigned to a content item that is engaging for one or more audiences relative to other audiences. In some examples, whether to assign the quirky popularity label to the first content item 506 may be determined based upon audience-level metrics of the first set of user engagement metrics 524.

In some examples, the audience-level metrics comprise the one or more first audience-level metrics associated with the first audience, the one or more second audience-level metrics associated with the second audience, and/or other audience-level metrics associated with other audiences. In some examples, the one or more first audience-level metrics comprise a first audience-level user engagement score associated with the first audience indicating a level of user engagement by users of the first audience towards the first content item 506. In some examples, the first audience-level user engagement score may be determined using one or more of the techniques provided herein with respect to determining the first user engagement score. In some examples, the quirky popularity label may be assigned to the first content item 506 based upon the first audience-level user engagement score associated with the first audience being greater than audience-level user engagement scores of other audiences.

In some examples, merely the first popularity label (e.g., a single popularity label) may be assigned to the first content item 506. In some examples, multiple popularity labels (e.g., the first popularity label and one or more other popularity labels of the plurality of popularity labels) may be assigned to the first content item 506.

At 414 of FIG. 4, the content system may generate, based upon the first popularity label assigned to the first content item 506, a first enhanced content presentation interface comprising the first content item 506. In some examples, the first enhanced content presentation interface may be used to present the first content item 506 based upon the first plurality label being assigned to the first content item 506. At 416, the content system may present the first enhanced content presentation interface, comprising the first content item 506, on a third client device 550 (shown in FIGS. 5E-5K). The third client device 550 may comprise at least one of a laptop, a desktop computer, a phone, a computer, a wearable device, a smart device, a television, any other type of computing device, hardware, etc.

In some examples, the content system may present the first enhanced content presentation interface on the third client device 550 in response to receiving a second request for content associated with the third client device 550. In some examples, the second request for content may correspond to a request to be provided with one or more content items (e.g., advertisements, images, links, videos, etc.) for presentation via the first internet resource, such as in a serving area of a third internet resource. The third internet resource corresponds to at least one of a web page of a website associated with the content system, an application associated with the content system, an internet game associated with the content system, etc. In the examples shown in FIGS. 5B and 5E-5K, the third internet resource may be the same as the first internet resource (e.g., the third internet resource accessed by the third client device 550 in FIGS. 5E-5K and the first internet resource accessed by the first client device 500 in FIG. 5B both correspond to the web page 513). Embodiments are contemplated in which the third internet resource is different than the first internet resource (e.g., the third internet resource may correspond to a different web page, a different application, etc. than the first internet resource). In response to the second request for content, the content system may perform a second content selection process to select a content item (e.g., the first content item 506) from among a second plurality of content items (e.g., content items participating in a second auction associated with the second request for content). The content system may present the first enhanced content presentation interface on the third client device 550 in response to selecting the first content item 506 (via the second content selection process, for example).

In some examples, the first enhanced content presentation interface may comprise an indication (e.g., a graphical object, text, an icon, an image, etc.) of the first popularity label. In an example, the first enhanced content presentation interface may display text comprising at least one of "Popular!", "Popular Ad!", "Popular Video!", "Seen by millions of users", "Audience Favorite", etc. Alternatively and/or additionally, the first enhanced presentation interface may display an indication of the engaging popularity label (e.g., text comprising "Engaging!" and/or a star icon and/or other type of graphical object representative of the engaging popularity label) based on the first popularity label being the engaging popularity label. Alternatively and/or additionally, the first enhanced presentation interface may display an indication of the ubiquity popularity label (e.g., text comprising "Ubiquitous!" and/or a globe icon and/or other type of graphical object representative of the ubiquity popularity label) based on the first popularity label being the ubiquity popularity label. Alternatively and/or additionally, the first enhanced presentation interface may display an indication of the widespread engaging popularity label (e.g., text comprising "Widespread and Engaging!" and/or a star icon, a globe icon, and/or other type of graphical object representative of the widespread engaging popularity label) based on the first popularity label being the widespread engaging popularity label. Alternatively and/or additionally, the first enhanced presentation interface may display an indication of the quirky popularity label (e.g., text comprising "Quirky!" and/or a unicorn icon and/or other type of graphical object representative of the quirky popularity label) based on the first popularity label being the quirky popularity label. Alternatively and/or additionally, the first enhanced presentation interface may display an indication of the trending popularity label (e.g., text comprising "Trending!" and/or a trending icon) based on the first popularity label being the trending popularity label.

In some examples, the first enhanced content presentation interface may comprise a modified version of the first content item 506. For example, generating the first enhanced content presentation interface may comprise modifying the first content item 506 to generate the modified version of the first content item 506. In some examples, at least one of a formatting, a structure, colors, etc. of the first content item 506 may be modified to generate the modified version of the first content item 506. In some examples, the first content time 506 may be supplemented with at least one of supplemental text, one or more supplemental graphical objects, one or more supplemental symbols (e.g., at least one of an asterisk "*", a hash symbol "#", etc.), etc. to generate the modified version of the first content item 506 (e.g., the modified version of the first content item 506 may comprise at least one of the supplemental text, the one or more supplemental graphical objects, etc. while the original version of the first content item 506 may not comprise at least one of the supplemental text, the one or more supplemental graphical objects, etc.). In some examples, at least one of text, one or more graphical objects, etc. of the first content time 506 may be removed to generate the modified version of the first content item 506 (e.g., the original version of the first content item 506 may comprise at least one of the text, the one or more graphical objects, etc. while the modified version of the first content item 506 may not comprise at least one of the text, the one or more graphical objects, etc.). In some examples, at least one of text, one or more graphical objects, etc. of the first content time 506 may be modified (e.g., reformatted, recolored, edited, etc.) to generate the modified version of the first content item 506 (e.g., the original version of the first content item 506 may comprise an original version of at least one of the text, the one or more graphical objects, etc. while the modified version of the first content item 506 may comprise a modified version of at least one of the text, the one or more graphical objects, etc.). In an example, a portion of the first content item 506 (e.g., text in the first content item 506, a title of the first content item 506, space in the first content item 506, etc.) may be at least one of emphasized, underlined, bolded, highlighted, colored, etc. to generate the modified version of the first content item 506.

In some examples, the first enhanced content presentation interface may comprise an indication of an audience associated with the first popularity label. In an example, the first popularity label may correspond to an audience-level popularity label associated with the first audience. In some examples, based upon the first popularity label being associated with the first audience, the first enhanced content presentation interface may display an indication of one or more characteristics (e.g., one or more demographics and/or one or more interests) associated with the first audience. In an example, the first audience may be associated with a first geographical region (e.g., the first audience may include users associated with the first geographical region). In an example, the first geographical region may correspond to a country (e.g., the United States of America), a state (e.g., Texas), a province, a city, and/or other region. In an example, the first enhanced content presentation interface may comprise an indication of the first geographical region (e.g., the first enhanced content presentation interface may comprise text comprising "This video is popular in the Midwest!"). Alternatively and/or additionally, the first enhanced content presentation interface may comprise an indication of an age range associated with the first audience (e.g., the first enhanced content presentation interface may comprise text comprising "This video is popular among 20-25 year olds in the Midwest!" and/or "This video is popular with Generation X!"). Alternatively and/or additionally, the first enhanced content presentation interface may comprise an indication of a user interest associated with the first audience (e.g., the first enhanced content presentation interface may comprise text comprising "This video is popular among people interested in fashion!" and/or "This video is popular among fashion lovers!").

In some examples, the first enhanced content presentation interface may comprise an indication of one or more metrics associated with the first content item 506. In some examples, the one or more metrics may be determined based upon the first set of user engagement metrics 524. In an example, the first enhanced content presentation interface may comprise (i) an indication of the first measure of content item presentations (e.g., text comprising "This ad was viewed over 1 million times"), (ii) an indication of the first measure of content item selections (e.g., text comprising "This ad was selected over 1 million times"), (iii) an indication of the fourth combined metric such as the click-through rate (e.g., text comprising "Most users who were shown this ad clicked on it"), (iv) an indication of the first measure of video completions (e.g., text comprising "This video was viewed in its entirety over 1 million times"), (v) an indication of the first measure of high resolution events (e.g., text comprising "This ad was viewed in HD quality over 1 million times"), (vi) an indication of the first measure of unmute events (e.g., text comprising "This video was unmuted over 1 million times"), (vii) an indication of the first combined metric (e.g., text comprising "Most users who started this video watched it completely"), (viii) an indication of the measure of share events (e.g., text comprising "This video was shared over 1 million times"), (ix) an indication of an audience-level metric and/or an indication of one or more characteristics (e.g., one or more demographics and/or one or more interests) associated with an audience associated with the audience-level metric (e.g., text comprising "This video was shared over 1 million times by users in Texas"), and/or (x) one or more other indications of one or more other metrics.

In some examples, the first enhanced content presentation interface may be associated with one or more presentational features of presenting the first content item 506. In some examples, the one or more presentational features may comprise at least one of the one or more parameters, one or more functions, one or more configurations, etc. used to present the first content item 506 (e.g., the original version of the first content item 506 and/or the modified version of the first content item 506) via the first enhanced content presentation interface. In some examples, the one or more presentational features may be enabled for presentations of the first content item 506 based upon the first popularity label being assigned to the first content item 506 (e.g., the one or more presentational features may be enabled to enhance the presentations of the first content item 506). In some examples, the one or more presentational features may be disabled for presentations of the first content item 506 performed by the content system when the first popularity label is not assigned to the first content item 506 (e.g., prior to the first popularity label being assigned to the first content item 506). In an example, the one or more presentational features may comprise (i) a feature associated with automatically presenting the first content item 506 with a first resolution (e.g., 1080p or 4K resolution), whereas when the first popularity label is not assigned to the first content item 506, the content system may present the first content item 506 with a second resolution lower than the first resolution, (ii) a feature associated with automatically presenting the first content item 506 with a first bit rate, whereas when the first popularity label is not assigned to the first content item 506, the content system may present the first content item 506 with a second bit rate lower than the first bit rate, (iii) a feature associated with automatically setting audio of the first content item 506 to start unmuted, whereas when the first popularity label is not assigned to the first content item 506, the content system may mute audio of the first content item 506 (until reception of a request to unmute the audio, for example), (iv) a feature associated with using a first presentation size to present the first content item 506 (e.g., a first video presentation size to present the first video), whereas when the first popularity label is not assigned to the first content item 506, the content system may present the first content item 506 with a second presentation size smaller than the first presentation size, (v) a feature associated with using a first video streaming mode to present the first content item 506 (e.g., the first video), whereas when the first popularity label is not assigned to the first content item 506, the content system may present the first video using a second video streaming mode that is different than the first video streaming mode, and/or (vi) one or more other features. In some examples, the first video streaming mode may be associated with a third resolution (higher than the second resolution, for example), a third bit rate (higher than the second bit rate, for example), a third presentation size (larger than the second presentation size, for example), a first contrast level, a first brightness level and/or one or more other content presentation parameters (e.g., video streaming parameters). In an example, the first video may be played (via the first enhanced content presentation interface) on the third client device 550 using the first video streaming mode. For example, the first video may be displayed on the third client device 550 according to at least one of the third resolution, the third bit rate, the third presentation size, the first contrast level, the first brightness level, etc.

Figure 5E:
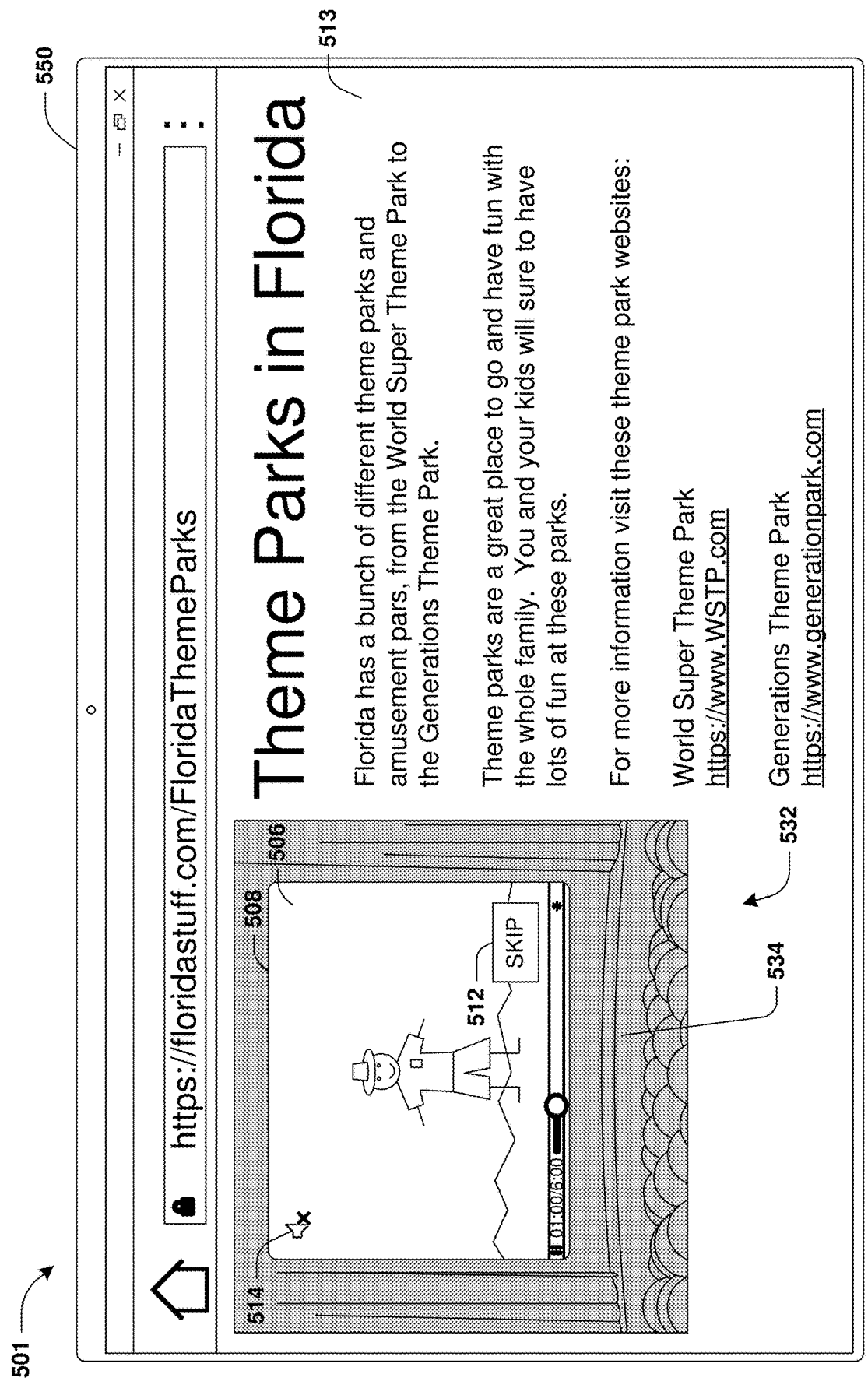
FIG. 5E is a component block diagram illustrating an example system for assigning popularity labels to content items and/or providing enhanced content presentation interfaces for presenting the content items, where an enhanced content presentation interface comprising a frame is presented on a client device.
Figure 5F:
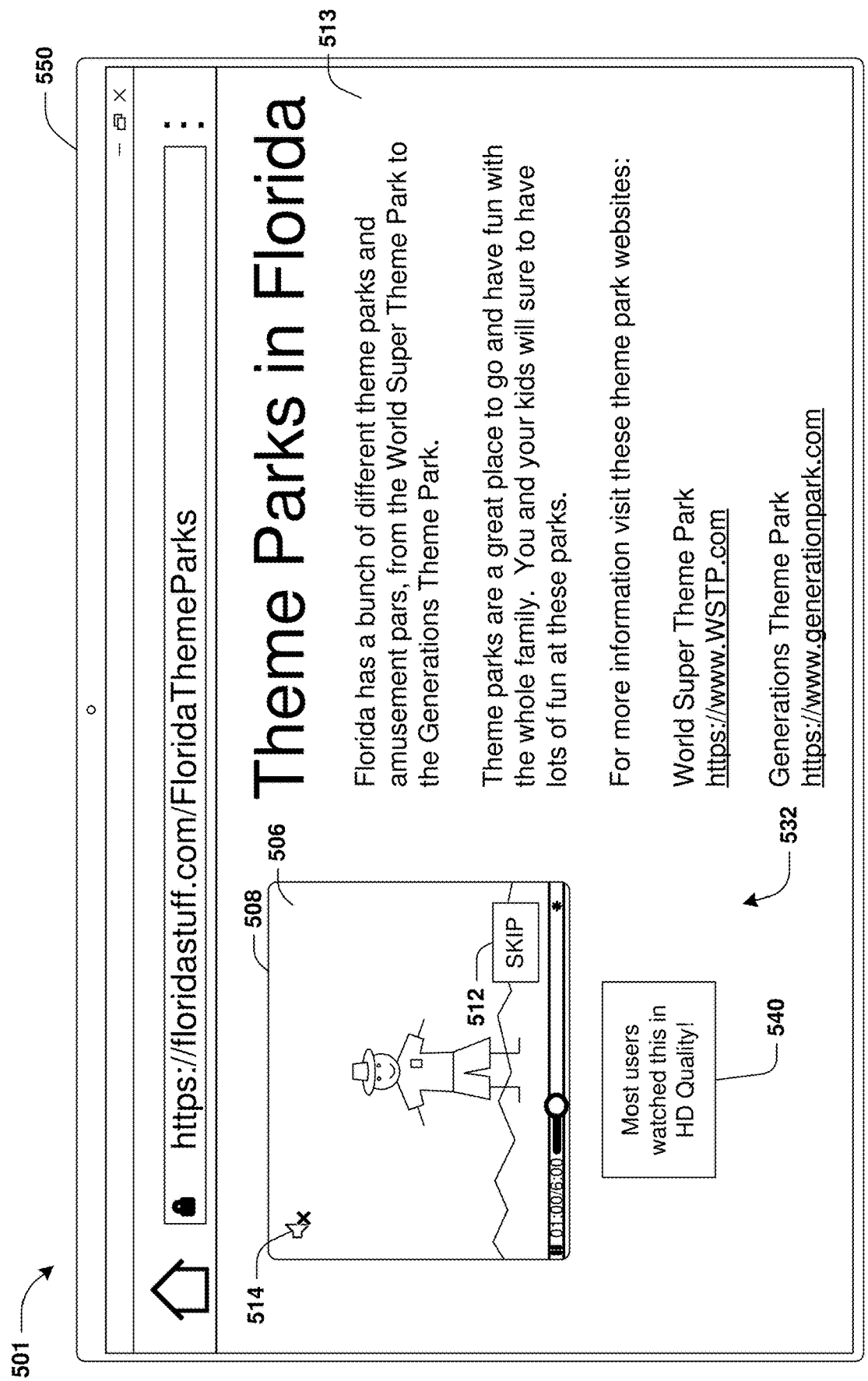
FIG. 5F is a component block diagram illustrating an example system for assigning popularity labels to content items and/or providing enhanced content presentation interfaces for presenting the content items, where an enhanced content presentation interface comprising an indication of a popularity metric is presented on a client device.
Figure 5G:
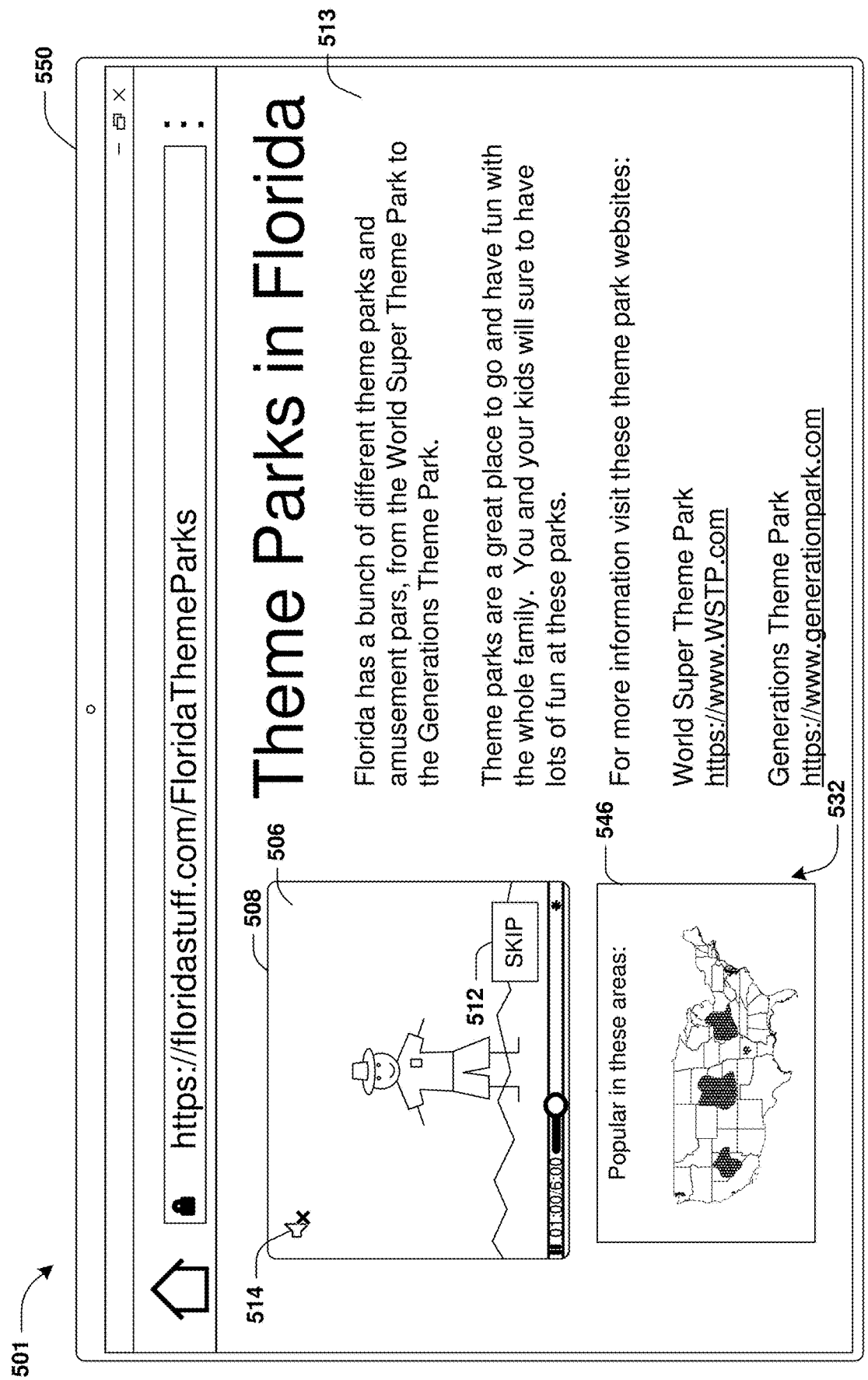
FIG. 5G is a component block diagram illustrating an example system for assigning popularity labels to content items and/or providing enhanced content presentation interfaces for presenting the content items, where an enhanced content presentation interface comprising an indication of one or more geographical regions is presented on a client device.
Figure 5H:
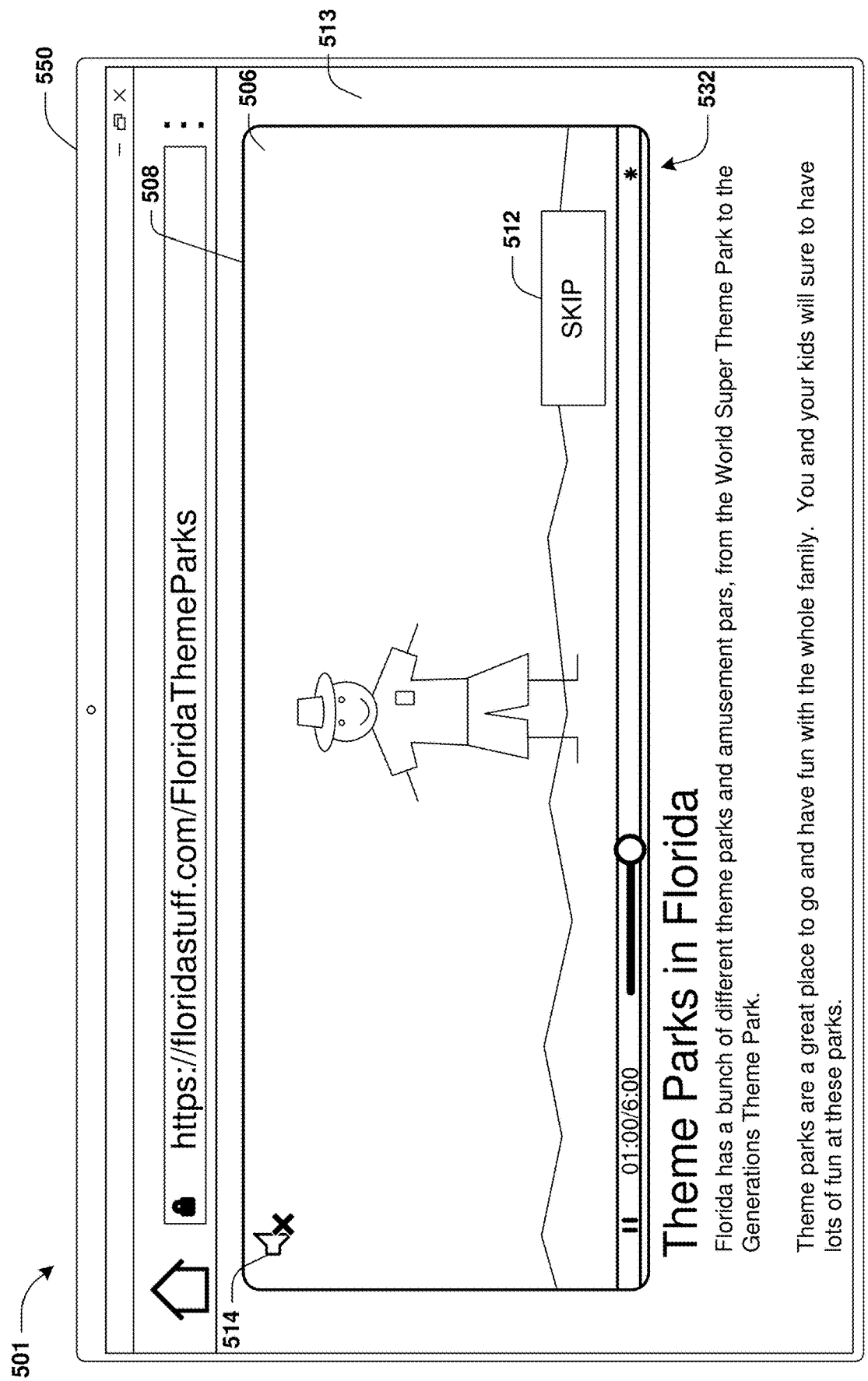
FIG. 5H is a component block diagram illustrating an example system for assigning popularity labels to content items and/or providing enhanced content presentation interfaces for presenting the content items, where an enhanced content presentation interface displaying a content item with a configured presentation size is presented on a client device.
Figure 5I:
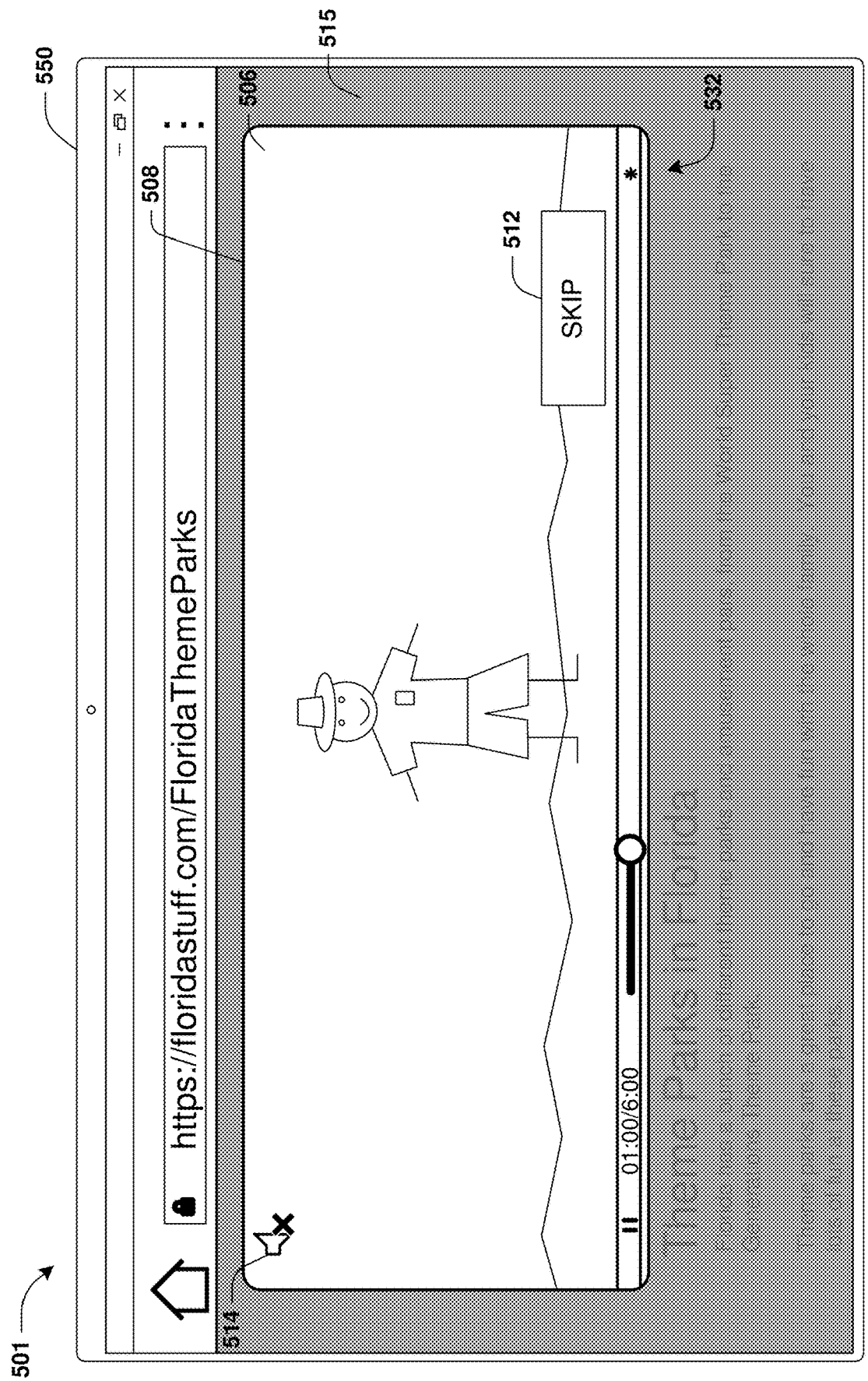
FIG. 5I is a component block diagram illustrating an example system for assigning popularity labels to content items and/or providing enhanced content presentation interfaces for presenting the content items, where an enhanced content presentation interface is presented concurrently with a modified interface on a client device.

Alternatively and/or additionally, the first video streaming mode may be associated with a background modification feature associated with modifying an interface of the third internet resource (e.g., the web page 513) to generate a modified interface (e.g., a modified version of the web page 513), and/or concurrently displaying the first content item 506 and the modified interface (such as discussed with respect to FIG. 5I).

Alternatively and/or additionally, the first video streaming mode may be associated with a social interaction feature associated with displaying a social interaction interface concurrently with the first content item 506. In some examples, the social interaction interface may comprise a chat interface (e.g., a real-time chatroom, a forum, etc.) in which users (e.g., users that are being provided with enhanced presentations of the first content item 506 using the first video streaming mode by the content system) may submit messages and view submitted messages (such that users viewing the first content item 506 can discuss the first content item 506 with each other in real time, for example). In some examples, the social interaction interface may comprise a selectable input that when selected triggers the content system to perform a reaction signal capture process for capturing a reaction signal (e.g., a real time reaction signal). For example, in response to triggering the reaction signal capture process, the content system may activate at least one of a camera, a microphone, etc. of the third client device 550 to capture the reaction signal, which may comprise at least one of a voice message, a video, a photograph, etc. In response to capturing the reaction signal, the reaction signal may be added (in real time, for example) to a set of reaction signals (submitted by other users, for example), which may be accessed using the social interaction interface.

Thus, in accordance with some embodiments, enabling the first video streaming mode for the first video (based upon the first popularity label being assigned to the first video, for example) may result in the first content item 506 being presented with one or more enhanced features and/or improved quality.

FIGS. 5E-5K illustrate examples of the first enhanced content presentation interface (shown with reference number 532) being presented on the third client device 550 (via the web page 513, for example) to present the first content item 506 (e.g., the original version of the first content item 506 and/or the modified version of the first content item 506).

FIG. 5E illustrates the first enhanced content presentation interface 532 according to an example in which the first enhanced content presentation interface 532 comprises a frame 534 around the first content item 506. In some examples, the frame 534 surrounds and/or encloses at least a portion of the first content item 506. In some examples, the frame 534 comprises one or more visual features exhibiting an environment (e.g., a surrounding environment), such as at least one of a cinema stage shown in FIG. 5E (e.g., the cinema stage may be shown in movie mode when the first content item 506 promotes a movie), a view of scenery (e.g., the view of scenery may be shown in nature mode when the first content item 506 is associated with nature), etc.

FIG. 5F illustrates the first enhanced content presentation interface 532 according to an example in which the first enhanced content presentation interface 532 comprises an indication 540 of a popularity metric (e.g., more than 50% of users of an audience viewed the first video with HD quality). In some examples, the indication 540 may comprise a selectable input. In some examples, in response to a selection of the indication 540, a resolution and/or bit rate of playback of the first video may be increased.

FIG. 5G illustrates the first enhanced content presentation interface 532 according to an example in which the first enhanced content presentation interface 532 comprises a graphical object 546 representative of a map of one or more geographical regions in which the first content item 506 is popular. In some examples, the graphical object 546 may be generated based upon one or more audience-level popularity labels associated with the one or more geographical regions being assigned to the first content item 506.

FIG. 5H illustrates the first enhanced content presentation interface 532 according to an example in which the first enhanced content presentation interface 532 automatically presents the first content item 506 with a presentation size (e.g., the first presentation size and/or the third presentation size) that is larger than the second presentation size used by the content system when the first popularity label is not assigned to the first content item 506. For example, the content system may display the first content item 506 with the larger presentation size (e.g., larger as compared to FIG. 5B, when the first popularity label is not assigned to the first content item 506, for example) without receiving a request to increase the presentation size.

FIG. 5I illustrates the first enhanced content presentation interface 532 according to an example in which the first enhanced content presentation interface 532 displays a modified interface 515 of the web page 513. In some examples, one or more areas outside the first content item 506 may be darkened (e.g., dimmed to provide for a cinema environment and/or to provide for increased ease of viewing the first content item 506 for an improved user experience). In some examples, in response to a selection of an area outside the first content item 506, the web page 513 may change to display an original (and/or non-dimmed) interface.

Figure 5J:
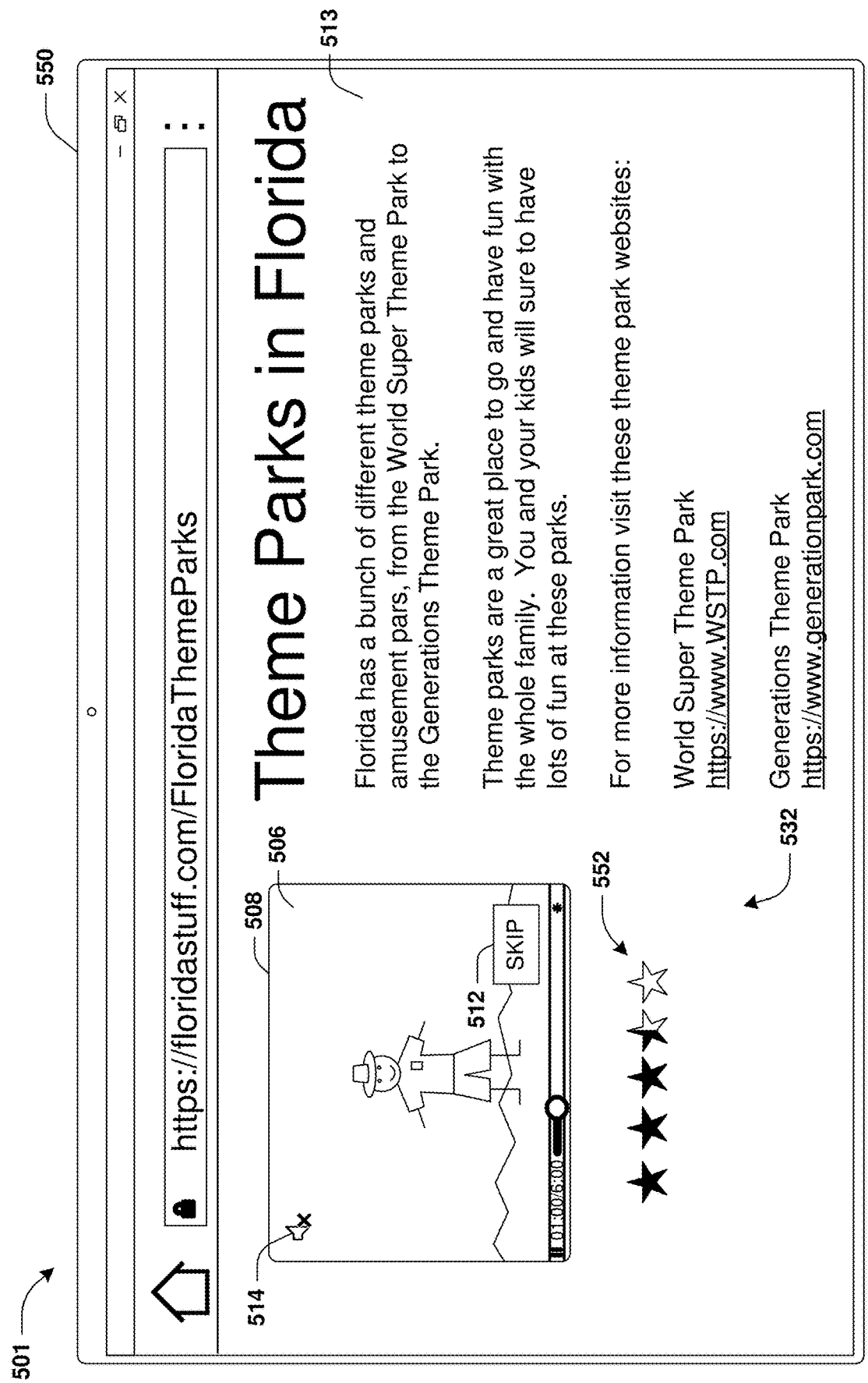
FIG. 5J is a component block diagram illustrating an example system for assigning popularity labels to content items and/or providing enhanced content presentation interfaces for presenting the content items, where an enhanced content presentation interface comprising a rating representation is presented on a client device.

FIG. 5J illustrates the first enhanced content presentation interface 532 according to an example in which the first enhanced content presentation interface 532 comprises a rating representation 552. In some examples, the rating representation 552 is indicative of a rating corresponding to a popularity level of the first content item 506 106. In some examples, the rating representation 552 may comprise a set of one or more filled, semi-filled and/or empty star icons. In an example shown in FIG. 5J, a rating of 3.5 out of 5 may be represented by three filled star icons, one half-filled star icon and one empty star icon. The rating indicated by the rating representation 552 may be determined based upon the first popularity score 528. For example, the rating may be a function of the first popularity score 528, where a higher value of the first popularity score 528 corresponds to a higher value of the rating.

Figure 5K:
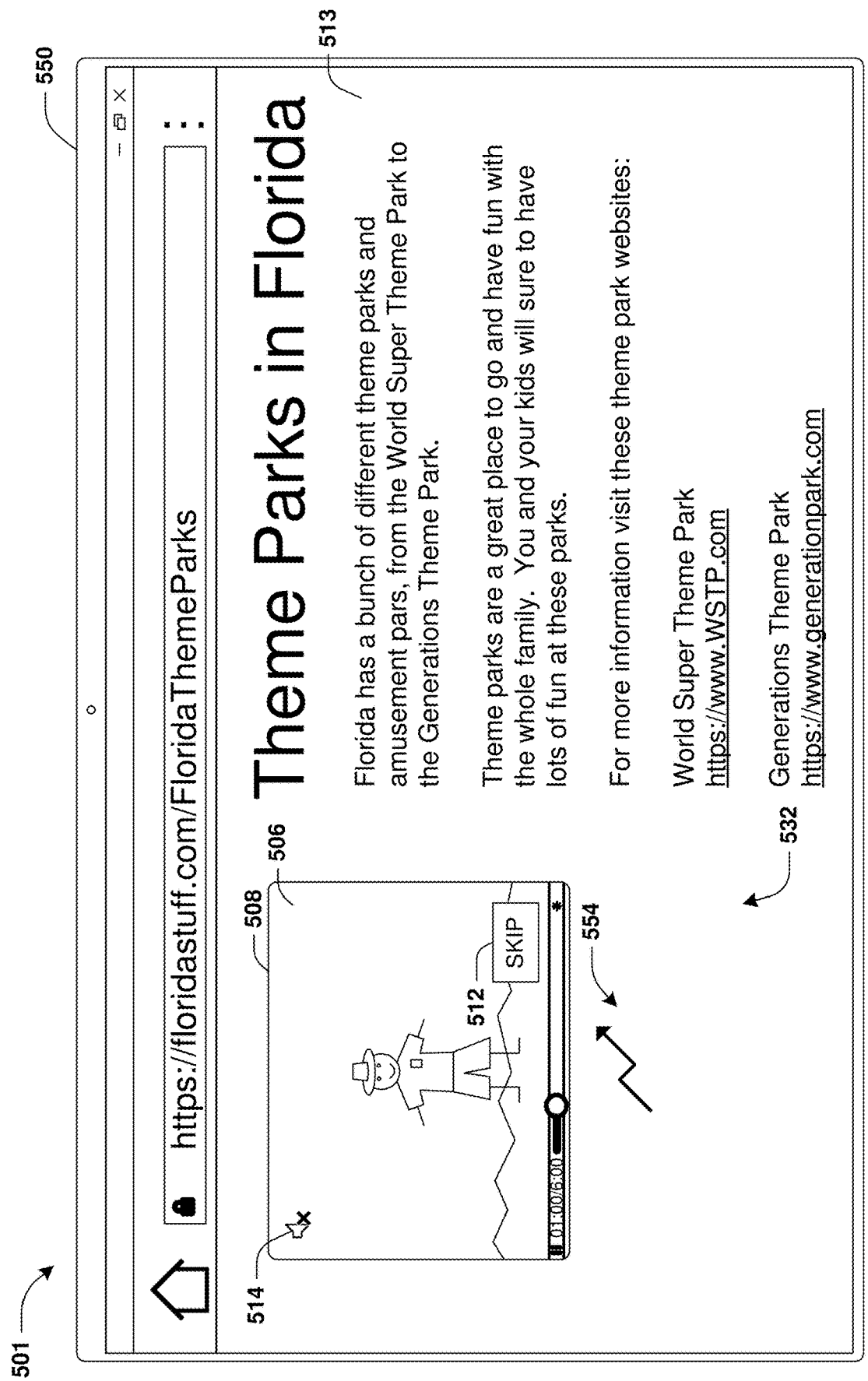
FIG. 5K is a component block diagram illustrating an example system for assigning popularity labels to content items and/or providing enhanced content presentation interfaces for presenting the content items, where an enhanced content presentation interface comprising a trending icon is presented on a client device.

FIG. 5K illustrates the first enhanced content presentation interface 532 according to an example in which the first enhanced content presentation interface 532 comprises a trending icon 554 to indicate that the first content item 506 is trending. In some examples, the first enhanced content presentation interface 532 may display the trending icon 554 based on the first popularity label being the trending popularity label.

In some examples, one or more features, graphical objects, text, etc. of the first enhanced content presentation interface 532 may overlay the first content item 506. In some examples, one or more features, graphical objects, text, etc. of the first enhanced content presentation interface 532 may be offset from the first content item 506.

An embodiment of tracking aggregate popularity metrics associated with content items is illustrated by an example method 600 of FIG. 6. In some examples, a content item popularity tracking system is provided. In some examples, the content item popularity tracking system is configured to (i) collect feedback associated with a content item from a plurality of entities, (ii) determine one or more aggregated metrics associated with the content item based upon the feedback collected from the plurality of entities, and/or (iii) provide the plurality of entities with access to the one or more aggregated metrics (e.g., an entity of the plurality of entities may use the one or more aggregated metrics to determine one or more popularity labels to assign to a content item).

In some examples, the content item popularity tracking system may comprise the content system. In some examples, the content item popularity tracking system may not comprise the content system, and/or the content system may correspond to an entity of the plurality of entities.

In some examples, an entity of the plurality of entities (e.g., each entity of one, some and/or all entities of the plurality of entities) may provide one or more services (e.g., a news service, an entertainment service, a business management, a personal calendar, a search engine, a social network platform, etc.) on one or more internet resources (e.g., at least one of web pages, applications, resources of a mobile application, resources of a web application, etc.) associated with the entity. In some examples, one or more content items (e.g., one or more advertisements, images, videos, etc.) may be presented to users accessing the one or more internet resources.

In some examples, each entity of one, some and/or all entities of the plurality of entities may submit feedback information (e.g., encrypted feedback information) associated with the first content item 506 to a blockchain (e.g., an encrypted blockchain). The blockchain may be associated with tracking user engagement with the first content item 506 across internet resources associated with the plurality of entities.

Figure 7A:
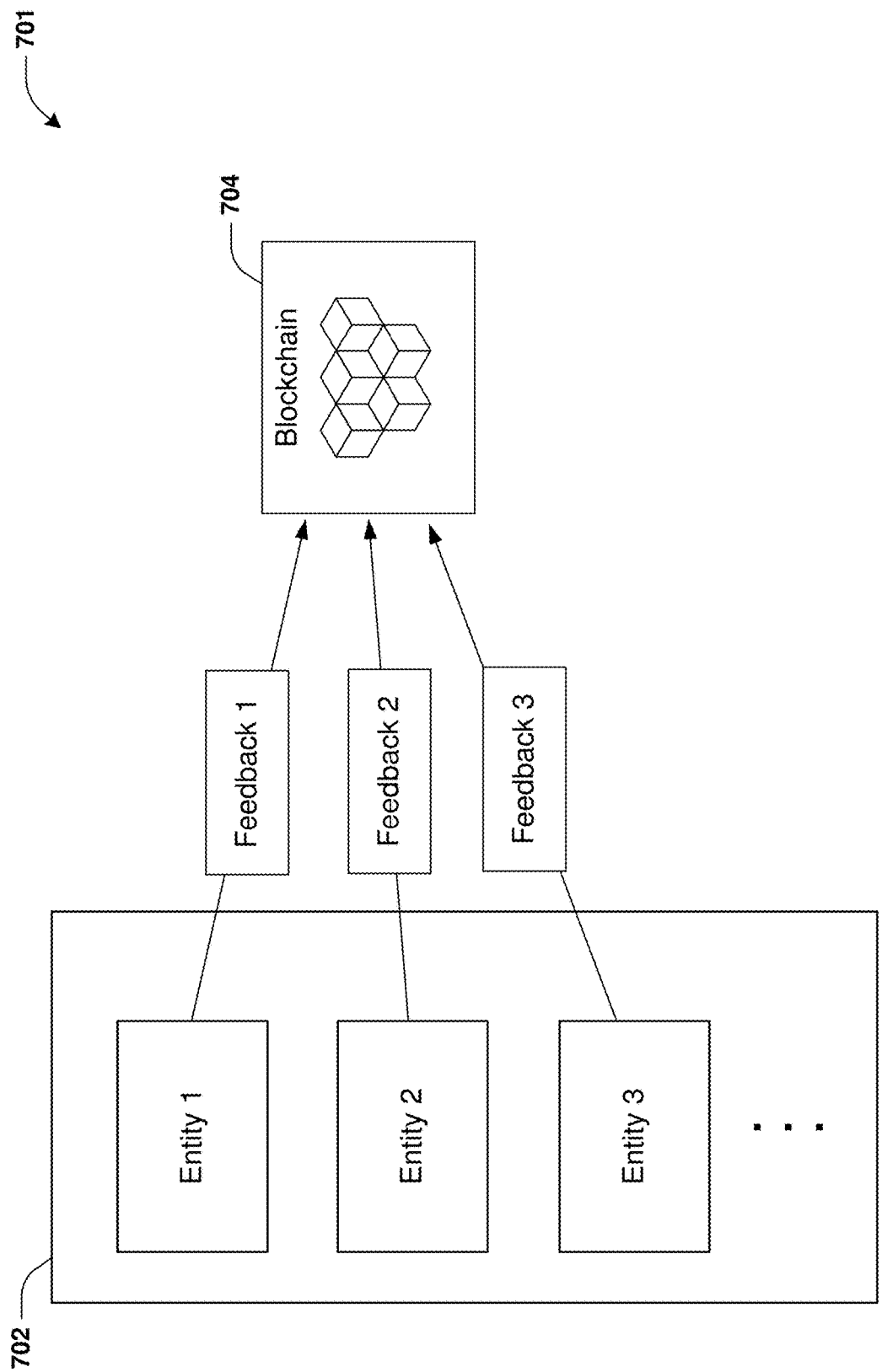
FIG. 7A is a component block diagram illustrating an example system for tracking aggregate popularity metrics associated with content items, where a plurality of entities submit feedback information associated with a first content item to a blockchain.

FIGS. 7A-7D illustrate examples of an example system 701 for tracking aggregate popularity metrics associated with content items, described with respect to the method 600 of FIG. 6. FIG. 7A illustrates entities of the plurality of entities (shown with reference number 702) submitting feedback information associated with the first content item 506 to the blockchain (shown with reference number 704). In some examples, an entity of the plurality of entities 702 (e.g., each entity of the plurality of entities 702) may be associated with presenting the first content item 506 to users. For example, the entity may present the first content item 506 to users via one or more internet resources (e.g., at least one of web pages, applications, resources of a mobile application, resources of a web application, etc.) associated with the entity. The plurality of entities 702 may comprise a second entity "Entity 1", a third entity "Entity 2", a fourth entity "Entity 3", etc.

In some examples, Entity 1 may correspond to a first internet resource-side entity (e.g., at least one of a content publisher, a website and/or application manager, etc.) associated with one or more second internet resources (e.g., at least one of web pages, applications, resources of a mobile application, resources of a web application, etc.). In some examples, Entity 1 provides one or more services using the one or more third internet resources. For example, the one or more services comprises at least one of a news service, an entertainment service, a business management, a personal calendar, a search engine, a social network platform, etc. In some examples, Entity 1 publishes content (e.g., news articles, articles about one or more topics, videos, a blog, etc.) on the one or more second internet resources associated with Entity 1. In some examples, one or more content items (e.g., one or more advertisements, images, videos, etc.) may be presented to users while the users view the published content. For example, the first content item 506 may be presented to a user on an internet resource of the one or more second internet resources while the user is concurrently shown at least a portion of the published content on the internet resource.

In some examples, Entity 2 may correspond to a second internet resource-side entity (e.g., at least one of a content publisher, a website and/or application manager, etc.) associated with one or more third internet resources (e.g., at least one of web pages, applications, resources of a mobile application, resources of a web application, etc.). In some examples, Entity 2 provides one or more second services using the one or more third internet resources. In some examples, Entity 2 publishes content on the one or more third internet resources associated with Entity 2. In some examples, one or more content items (e.g., one or more advertisements, images, videos, etc.) may be presented to users while the users view the published content on the one or more third internet resources.

In some examples, each entity of one, some and/or all entities of the plurality of entities 702 may receive feedback signals in response to content item presentations of the first content item 506 performed on internet resources associated with the entity (e.g., the feedback signals may be received using one or more of the techniques provided herein with respect to receiving the first feedback signal, the second feedback signal and/or the plurality of feedback signals). For example, at least one of Entity 1 may receive a first set of feedback signals associated with the first content item 506, Entity 2 may receive a second set of feedback signals associated with the first content item 506, Entity 3 may receive a third set of feedback signals associated with the first content item 506, etc. The first set of feedback signals may be indicative of user reactions to content item presentations of the first content item 506 performed using the one or more second internet resources associated with Entity 1. The second set of feedback signals may be indicative of user reactions to content item presentations of the first content item 506 performed using the one or more third internet resources associated with Entity 2. The third set of feedback signals may be indicative of user reactions to content item presentations of the first content item 506 performed using one or more fourth internet resources associated with Entity 3.

In some examples, the plurality of entities 702 may submit a plurality of sets of feedback information associated with the first content item 506 to the blockchain 704. For example, the plurality of sets of feedback information (e.g., encrypted data) may be stored and/or published on the blockchain 704 by the plurality of entities 702. A set of feedback information (of the plurality of sets of feedback information) from an entity (of the plurality of entities 702) may be associated with (e.g., based on and/or indicative of) user engagement with the first content item 506 via one or more internet resources associated with the entity. In an example shown in FIG. 7A, Entity 1 may submit a first set of feedback information "Feedback 1" of the plurality of sets of feedback information to the blockchain 704, Entity 2 may submit a second set of feedback information "Feedback 2" of the plurality of sets of feedback information to the blockchain 704, Entity 3 may submit a third set of feedback information "Feedback 3" of the plurality of sets of feedback information to the blockchain 704, etc.

An entity may determine a set of feedback information of the plurality of sets of feedback information based upon feedback signals (received by the entity, for example) associated with the first content item 506.

In an example, Feedback 1 may be determined based upon the first set of feedback signals associated with the first content item 506. Feedback 1 may be associated with user engagement with the first content item 506 in association with content item presentations in which the first content item 506 is presented on client devices via the one or more second internet resources associated with Entity 1. In some examples, Feedback 1 may be indicative of the first set of feedback signals. Alternatively and/or additionally, Feedback 1 may be indicative of metrics (e.g., user engagement metrics) determined using the first set of feedback signals. In some examples, the metrics of Feedback 1 may have one, some and/or all of the types of metrics discussed with respect to the first set of user engagement metrics 524. Alternatively and/or additionally, the metrics of Feedback 1 may be determined based upon the first set of feedback signals using one, some and/or all of the types of techniques discussed with respect to determining the first set of user engagement metrics 524 based upon the plurality of feedback signals associated with the first content item 506.

In an example, Feedback 2 may be determined based upon the second set of feedback signals associated with the first content item 506. Feedback 2 may be associated with user engagement with the first content item 506 in association with content item presentations in which the first content item 506 is presented on client devices via the one or more third internet resources associated with Entity 2. In some examples, Feedback 2 may be indicative of the second set of feedback signals. Alternatively and/or additionally, Feedback 2 may be indicative of metrics (e.g., user engagement metrics) determined using the second set of feedback signals. In some examples, the metrics of Feedback 2 may have one, some and/or all of the types of metrics discussed with respect to the first set of user engagement metrics 524. Alternatively and/or additionally, the metrics of Feedback 2 may be determined based upon the second set of feedback signals using one, some and/or all of the types of techniques discussed with respect to determining the first set of user engagement metrics 524 based upon the plurality of feedback signals associated with the first content item 506.

Figure 7B:
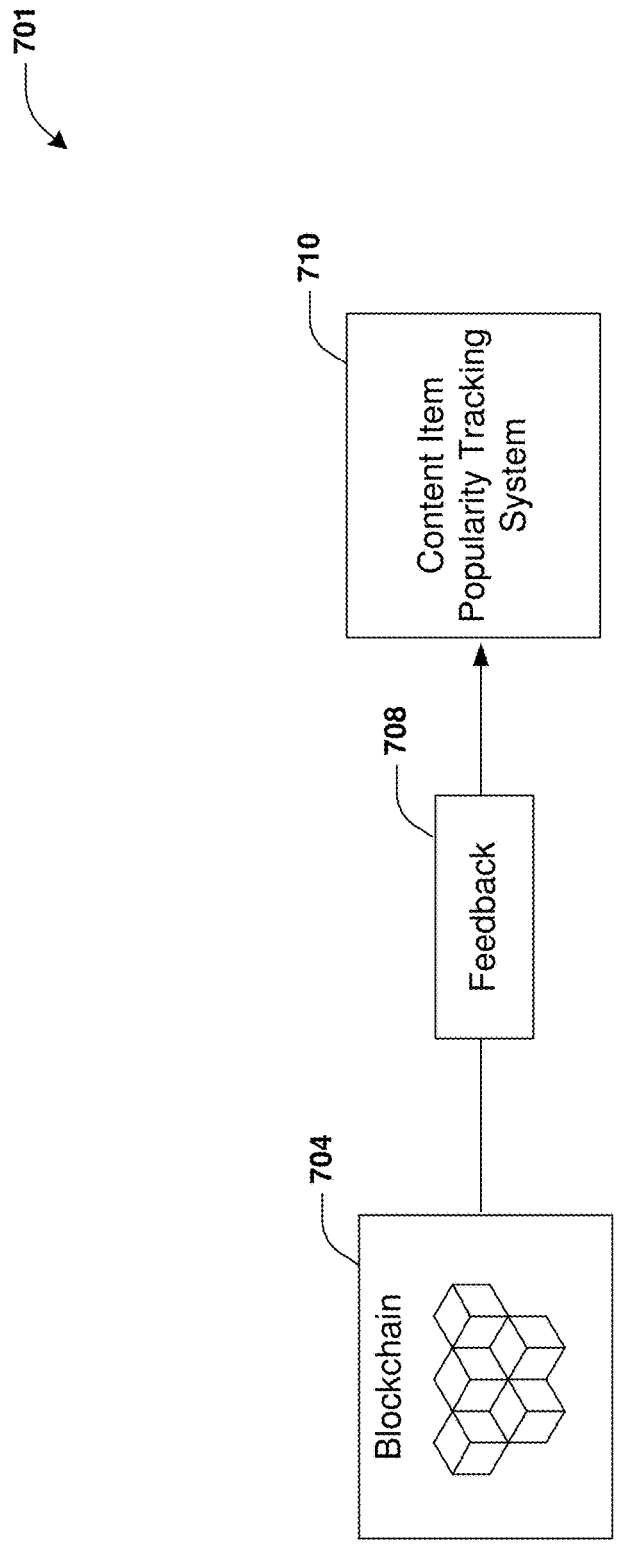
FIG. 7B is a component block diagram illustrating an example system for tracking aggregate popularity metrics associated with content items, where a server of a content item popularity tracking system retrieves a plurality of sets of feedback information from a blockchain.

At 602 of FIG. 6, the content item popularity tracking system may access the blockchain 704 to identify the plurality of sets of feedback information. For example, the content item popularity tracking system may retrieve (e.g., decrypt and/or read) the plurality of sets of feedback information (submitted by the plurality of entities 702) from the blockchain 704. In some examples, the content item popularity tracking system is authorized to access the plurality of sets of feedback information (e.g., the content item popularity tracking system is in possession of one or more valid keys to access the plurality of sets of feedback information). In some examples, an entity of the plurality of entities 702 is not authorized to access a set of feedback information stored in the blockchain 704 that is submitted by a different entity of the plurality of entities 702. For example, Entity 1 may not be authorized to access Feedback 2 (submitted by Entity 2) and/or Feedback 3 (submitted by Entity 3) in the blockchain 704 (e.g., Entity 1 may not be in possession of a valid key to access Feedback 2 and/or Feedback 3). FIG. 7B illustrates a server 710 of the content item popularity tracking system retrieving (e.g., decrypting and/or reading) the plurality of sets of feedback information (shown with reference number 708) from the blockchain 704.

At 604, the content item popularity tracking system may determine, based upon the plurality of sets of feedback information 708, one or more first aggregated popularity metrics associated with the first content item 506. For example, the content system popularity tracking system may determine the one or more first aggregated popularity metrics associated with the first content item 506 based upon a combination of some and/or all sets of feedback information of the plurality of sets of feedback information 704.

In some examples, the one or more first aggregated popularity metrics may comprise one or more metrics (e.g., user engagement metrics) determined using the plurality of sets of feedback information 704. In some examples, the one or more first aggregated popularity metrics may comprise one, some and/or all of the types of metrics discussed with respect to the first set of user engagement metrics 524. Alternatively and/or additionally, the one or more first aggregated popularity metrics may comprise may be determined based upon the plurality of sets of feedback information 708 using one, some and/or all of the types of techniques discussed with respect to determining the first set of user engagement metrics 524 based upon the plurality of feedback signals associated with the first content item 506.

In an example, each set of feedback information of some and/or all of the plurality of sets of feedback information 704 comprise a value corresponding to a metric of a first type (e.g., a type of metric discussed herein with respect to the first set of user engagement metrics 524). The content item popularity tracking system may determine a first aggregated metric (of the one or more first aggregated popularity metrics, for example) corresponding to the first type of metric based upon values, indicated by the plurality of sets feedback information 704, corresponding to the first type of metric. In an example, the values corresponding to the first type of metric may be combined to determine the first aggregated metric corresponding to the first type of metric. In an example, the values may be combined by performing one or more operations (e.g., mathematical operations) using the values. For example, the values may be combined by summing the values to determine the first aggregated metric. Alternatively and/or additionally, the values may be combined by summing denominators (e.g., measures of content item presentations of the first content time 506, audience sizes, etc.) of the values to determine an aggregated denominator, summing numerators (e.g., measures of content item selections of the first content item 506, measures of video completions of the first content item 506, etc.) of the values to determine an aggregated numerator, and/or determining the first aggregated metric based upon the aggregated denominator and the aggregated numerator (e.g., dividing the aggregated numerator by the aggregated denominator to determine the first aggregated metric).

In some examples, the plurality of sets of feedback information may be analyzed to identify an anomalous set of feedback information (e.g., an outlier). The anomalous set of feedback information may be identified based upon a determination that one or more differences between data of the anomalous set of feedback information and data of other sets of feedback information of the plurality of sets of feedback information meet (e.g., exceed a threshold difference, which may be reflective of at least one of fraud, mismeasurement, etc. The anomalous set of feedback information may be discarded and/or may not be used to determine the one or more first aggregated popularity metrics.

Alternatively and/or additionally, feedback information from one or more first entities of the plurality of entities may be weighted more than feedback information from one or more second entities of the plurality of entities such that the feedback information from the one or more first entities has more influence on a determination of a metric of the one or more first aggregated metrics (so as to create a balanced panel of metrics and/or to focus on one or more subsets of an audience more than other subsets of the audience, for example). Alternatively and/or additionally, the feedback information from the one or more first entities may be weighted more than the feedback information from the one or more second entities based upon the one or more first entities being associated with one or more first performance measures that are greater (and/or better) than one or more second performance measures associated with the one or more second entities (e.g., the one or more first performance measures may indicate a higher measure of content item selections, a higher measure of video completions, etc. than the one or more second performance measures).

In some examples, the one or more first aggregated popularity metrics may comprise one or more scores (e.g., at least one of a popularity score, a user sentiment score, a user engagement score, etc. associated with the first content item 506) determined using the plurality of sets of feedback information 704. In some examples, the one or more scores may be determined (by the content item popularity tracking system and/or based upon metrics indicated by the plurality of sets feedback information 704, for example) using one or more of the techniques provided herein with respect to determining the first popularity score 528, the first user sentiment score and/or the first user engagement score based upon the first set of user engagement metrics 524.

Figure 7C:
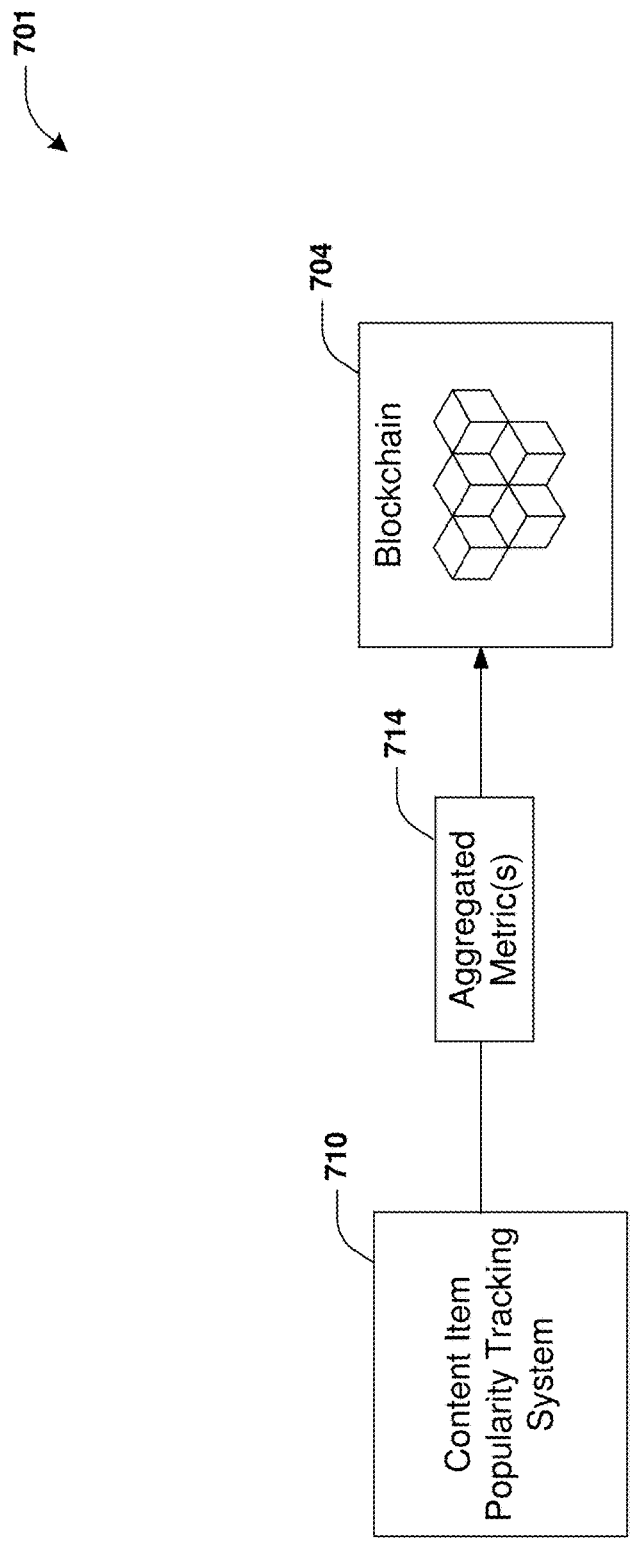
FIG. 7C is a component block diagram illustrating an example system for tracking aggregate popularity metrics associated with content items, where a server of a content item popularity tracking system stores one or more first aggregated popularity metrics on a blockchain.

At 606 of FIG. 6, the content item popularity tracking system may store the one or more first aggregated popularity metrics in the blockchain 704. The one or more first aggregated popularity metrics may be encrypted. FIG. 7C illustrates the server 710 of the content item popularity tracking system storing the one or more first aggregated popularity metrics (shown with reference number 714) in the blockchain 704.

The one or more first aggregated popularity metrics 714 may be used by an entity of the plurality of entities 702 to (i) determine a popularity score (e.g., the first popularity score 528) associated with the first content item 506, (ii) determine (based upon the popularity score and/or one or more metrics of the one or more first aggregated popularity metrics 714, for example) whether to assign one or more popularity labels to the first content item 506 (such as using one or more of the techniques with respect to determining to assign the first popularity label and/or one or more other popularity labels to the first content item 506 based upon the first set of user engagement metrics 524, the first popularity score 528, the first user sentiment score and/or the first user engagement score), and/or (iii) based upon a popularity label assigned to the first content item 506, provide an enhanced content presentation interface for presenting the first content item 506 to one or more users.

Figure 7D:
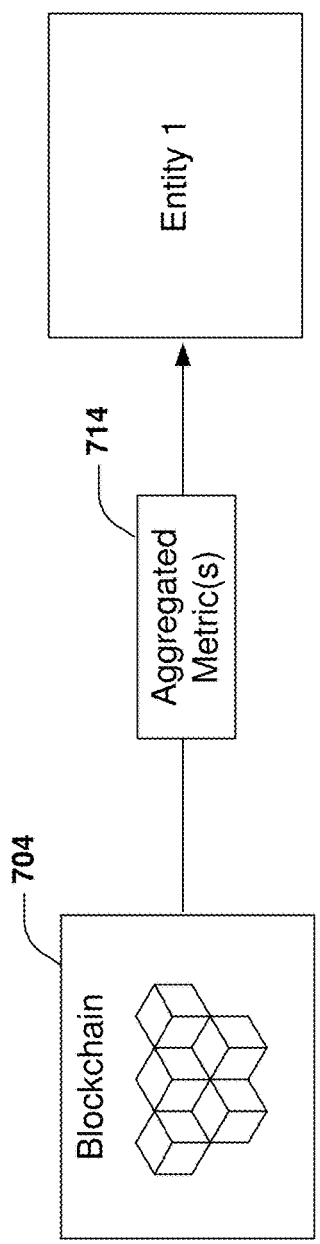
FIG. 7D is a component block diagram illustrating an example system for tracking aggregate popularity metrics associated with content items, where an entity retrieves one or more first aggregated popularity metrics from a blockchain.

In some examples, one, some and/or all entities of the first plurality of entities are authorized to access the one or more first aggregated popularity metrics 714 in the blockchain 704 (e.g., one, some and/or all entities of the first plurality of entities may be in possession of one or more valid keys to access the one or more first aggregated popularity metrics 714). For example, Entity 1 may access the blockchain 704 to identify the one or more first aggregated popularity metrics 714 in the blockchain 704. FIG. 7D illustrates Entity 1 retrieving (e.g., decrypting and/or reading) the one or more first aggregated popularity metrics 714 from the blockchain 704.

In an example, Entity 1 corresponds to the content system (discussed with respect to FIGS. 4 and 5A-5K, for example), and/or the one or more second internet resources associated with Entity 1 may comprise the one or more first internet resources associated with the content system. The content system (e.g., Entity 1) may determine the first set of feedback information "Feedback 1" based upon the plurality of feedback signals associated with content item presentations of the first content item 506 performed using the content system (on the one or more first internet resources, for example). Thus, in accordance with some embodiments, the content system may determine the first popularity score 528 by (i) determining the first set of feedback information "Feedback 1" based upon the plurality of feedback signals, (ii) submitting the first set of feedback information "Feedback 1" to the blockchain 704, (iii) accessing the blockchain 704 to identify an indication of the one or more first aggregated popularity metrics 714 in the blockchain 704, and/or (iv) determining the first popularity score 528 based upon the one or more first aggregated popularity metrics 714. In some examples, the first popularity score 528 is equal to a metric of the one or more first aggregated popularity metrics 714. In some examples, the first popularity score 528 is not equal to a metric of the one or more first aggregated popularity metrics 714. Accordingly, implementation of one or more of the techniques herein may enable the content system to leverage feedback information collected by other entities of the plurality of entities in combination with the first set of feedback information "Feedback 1" collected by the content system to more accurately determine the first popularity score 528 associated with the first content item 506 and/or to more accurately determine whether to assign a popularity label to the first content item 506.

In some examples, aggregated popularity metrics provided by the content item popularity tracking system for an entity of the plurality of entities may be customizable (by the entity, for example). In an example, the content item popularity tracking system may determine the one or more first aggregated popularity metrics 714 based upon a first aggregated metric customization configuration received from Entity 1 (e.g., the content system). For example, the first aggregated metric customization configuration may be indicative a first set of (one or more) importance levels of a set of (one or more) features. The one or more first aggregated popularity metrics 714 may be determined by weighting the set of features based upon the first set of importance levels. In an example, the set of features may comprise a first feature and a second feature. The first set of importance levels may indicate a first importance level for the first feature and a second importance level for the second feature. Accordingly, when the first importance level is higher than the second importance level, weighting the first feature based upon the first importance level and/or the second feature based upon the second importance level may result in a value corresponding to the first feature having more influence on a determination of a metric of the one or more first aggregated popularity metrics 714 than a value corresponding to the second feature. In an example, the first feature may correspond to a measure of unmute events (e.g., the first measure of unmute events) and/or the second feature may correspond to a measure of high resolution events (e.g., the first measure of high resolution events). In the example, when the first importance level is higher than the second importance level, weighting the first feature based upon the first importance level and/or the second feature based upon the second importance level may result in the measure of unmute events having more influence on a determination of a metric of the one or more first aggregated popularity metrics 714 than the measure of high resolution events. In some examples, Entity 1 may be authorized to access the one or more first aggregated popularity metrics 714 determined based upon the first aggregated metric customization configuration (e.g., Entity 1 is in possession of one or more valid keys to access the plurality of sets of feedback information). In some examples, other entities (other than Entity 1) of the plurality of entities 702 may not be authorized to access the one or more first aggregated popularity metrics 714 determined based upon the first aggregated metric customization configuration (e.g., Entity 2, Entity 3, etc. may not be in possession of a valid key to access the one or more first aggregated popularity metrics 714). Entity 1 may access the blockchain 704 to retrieve (e.g., decrypt and/or read) the one or more first aggregated popularity metrics 714. Alternatively and/or additionally, the first aggregated metric customization configuration may be indicative of a first set of audience characteristics of an audience. The first set of audience characteristics may comprise one or more interests of users in the audience and/or one or more demographics associated with users in the audience such as at least one of location, age, etc. The content item popularity tracking system may use the first set of audience characteristics to determine one or more audience-level metrics and/or one or more audience-level popularity scores corresponding to the audience (defined by the first set of audience characteristics, for example). The content item popularity tracking system may include the one or more audience-level metrics (determined based upon the first set of audience characteristics indicated by the first aggregated metric customization configuration) in the one or more first aggregated popularity metrics 714 (for Entity 1, for example).

Alternatively and/or additionally, the content item popularity tracking system may determine the one or more second aggregated popularity metrics based upon a second aggregated metric customization configuration received from Entity 2. For example, the second aggregated metric customization configuration may be indicative a second set of (one or more) importance levels of the set of features. The one or more second aggregated popularity metrics may be determined by weighting the set of features based upon the second set of importance levels. The second set of importance levels may be different than the first set of importance levels. Alternatively and/or additionally, the second aggregated metric customization configuration may be indicative of a second set of audience characteristics different than the first set of audience characteristics. Thus, in accordance with some embodiments, the one or more second aggregated popularity metrics (determined for Entity 2, for example) may be different than the one or more first aggregated popularity metrics (determined for Entity 1, for example). In some examples, Entity 2 may be authorized to access the one or more second aggregated popularity metrics determined based upon the second aggregated metric customization configuration (e.g., Entity 2 is in possession of one or more valid keys to access the plurality of sets of feedback information). In some examples, other entities (other than Entity 2) of the plurality of entities 702 may not be authorized to access the one or more second aggregated popularity metrics determined based upon the second aggregated metric customization configuration (e.g., Entity 1, Entity 3, etc. may not be in possession of a valid key to access the one or more second aggregated popularity metrics). Entity 2 may access the blockchain 704 to retrieve (e.g., decrypt and/or read) the one or more second aggregated popularity metrics.

In some examples, the first enhanced content presentation interface 532 may comprise an indication of a type of media (e.g., public television, cable television, a website, etc.) on which the first content item 506 has been presented. For example, a graphical object indicating television (e.g., a television icon) may be displayed based upon a determination that the first content item 506 was presented on a television channel (e.g., an indication of the television channel may be displayed by the first enhanced content presentation interface 532). Alternatively and/or additionally, the first enhanced content presentation interface 532 may comprise an indication of one or more third entities associated with presenting the first content item 506 (e.g., the one or more third entities may be associated with one or more websites, one or more applications, etc. where the first content item 506 was presented). In some examples, the plurality of entities comprise the one or more third entities. In some examples, the content item popularity tracking system may confirm and/or verify that the one or more third entities actually presented the first content item 506 based upon feedback information submitted by the one or more third entities to the blockchain 704, thereby providing for increased accuracy of the indication of the one or more third entities.

In some examples, the content item popularity tracking system may be an entity of the plurality of entities 702. Alternatively and/or additionally, the content item popularity tracking system may be a third party different than each entity of the plurality of entities 702.

It may be appreciated that using the blockchain 704 in accordance with one or more of the techniques provided herein to store feedback information of multiple entities and/or determine aggregated metrics based upon the feedback information provides for increased visibility and/or verifiability of feedback information submitted by an entity and/or aggregated metric(s) submitted by the content item popularity tracking system. The increased visibility and/or verifiability may provide for increased efficiency and/or accuracy with which the content item popularity tracking system determines the aggregated metric(s), and thus may provide for increased accuracy of one or more popularity scores determined for a content item and/or increased accuracy of one or more popularity labels assigned to the content item based upon the one or more popularity metrics.

In some examples, the blockchain 704 may comprise one or more digital contracts (e.g., smart contracts) associated with Entity 1. For example, the one or more digital contracts may comprise a first digital contract associated with usage of feedback information provided by Entity 1. For example, the first digital contract may be executed in response to one or more conditions being met. In some examples, the one or more conditions comprise a condition that the feedback information provided by Entity 1 be combined with at least a threshold amount of data provided by other entities of the plurality of entities such that the feedback information provided by Entity 1 is sufficiently obfuscated. In some examples, the one or more conditions comprise a condition that aggregated metrics determined using the feedback information provided by Entity 1 not be used by one or more competitor entities (of the plurality of entities, for example). In some examples, execution of the first digital contract may trigger the feedback information provided by Entity 1 to be combined with other feedback information provided by other entities to determine one or more aggregated metrics associated with the first content item 506, and/or storing the one or more aggregated metrics on the blockchain 704.

In some examples, the one or more digital contracts may comprise a second digital contract associated with compensation to Entity 1 (from one or more other entities of the plurality of entities, and/or from a third party different than the plurality of entities) in exchange for usage of the feedback information provided by Entity 1. For example, the second digital contract may be executed in response to the feedback information provided by Entity 1 being accessed to determine aggregated metrics associated with the first content item 506. Alternatively and/or additionally, the second digital contract may be executed in response to the aggregated metrics associated with the first content item 506 being stored in the blockchain 704. In some examples, execution of the second digital contract may trigger a transfer of funds from an account of an entity of the plurality of entities to an account of Entity 1. In some examples, an amount of compensation of the transfer of funds may be based upon (e.g., equal to) a compensation value defined by the second digital contract.

It may be appreciated that other data storage and/or management systems other than blockchain may be implemented in accordance with one or more of the embodiments herein. For example, the blockchain 704 may be replaced with a data store corresponding to a type of data storage and/or management system different than the blockchain 704 (e.g., the data store may comprise at least one of a database, a non-decentralized data store, etc.).

Implementation of at least some of the disclosed subject matter may lead to benefits including a reduction in screen space and/or an improved usability of a display (e.g., of a client device) (e.g., as a result of providing the first enhanced content presentation interface 532 to (i) display an indication of the first popularity label to notify a user of a popularity and/or type of popularity of the first content item 506 among an audience, (ii) display the frame exhibiting an environment, and/or (iii) automatically present the first content item 506 with higher quality playback settings as compared to playback settings used to present the first content item 506 when the first popularity label is not assigned to the first content item 506).

In some examples, when the first enhanced content presentation interface 532 is used to present the first content item 506 on a client device, in response to a selection of a selectable input of the first enhanced content presentation interface 532 and/or the first content item 506, the first enhanced content presentation interface 532 may display a summary of the first content item 506. In an example in which the first content item 506 is the first video, the first video may be transcribed automatically using a voice transcription module, and/or a transcription of the first video may be summarized (using a natural language processing module, for example) to generate the summary. In an example, the first enhanced content presentation interface 532 may display a graphical object, comprising the summary, on the client device. In some examples, the graphical object may make up merely a portion of a display of the client device. Alternatively and/or additionally, while the graphical object is displayed, in response to a selection (e.g., a click and/or a finger touch) of an area outside the graphical object (e.g., an area, of the display of the client device, that is offset from the graphical object), the graphical object may be closed and/or no longer displayed (e.g., at least a portion of a graphical user interface displayed prior to the selection of the selectable input may be made visible by closing and/or no longer displaying the graphical object). In an example, the graphical object may comprise a selectable input associated with enlarging the first content item 506 and/or starting playback of the first content item 506 (e.g., in response to a selection of the selectable input in the graphical object, the first video may start).

In some examples, the client device is configured to display a menu listing one or more features (e.g., selectable features) of the content system. The one or more features may comprise at least one of a content feature, a messaging feature, a social media feed feature, etc. In an example, in response to a selection of the content feature, the content feature may provide one or more resources (e.g., data, an interface, etc.) for displaying and/or engaging with content items (e.g., videos, images, audio files, news articles, etc.). In response to a selection of the messaging feature, the messaging feature may provide one or more resources (e.g., data, an interface, etc.) for displaying and/or facilitating messaging conversations (e.g., private messaging conversations and/or public messaging conversations) between users of the content system (e.g., users of the content system may send messages to each other using the messaging feature of the content system). In response to a selection of the social media feed feature, the social media feed feature may provide one or more resources (e.g., data, an interface, etc.) for displaying social media posts and/or comments on a social media platform. In some examples, the client device is configured to display a content platform application summary that can be reached directly from the menu, wherein the content platform application summary displays a limited list of data offered within the one or more features. In some examples, each of the data in the limited list of data is selectable to launch the respective feature (of the one or more features) and enable the selected data to be seen within the respective feature. In some examples, the content platform application summary is displayed while the one or more features are in an un-launched and/or unopened state.

In some examples, a multidimensional scoring system is used to determine one or more scores (e.g., popularity scores, audience-level popularity scores, etc.) associated with the first content item 506. In some examples, the multidimensional scoring system determines the one or more scores based upon a plurality of dimensions comprising (i) gender identities (e.g., male, female, non-binary, etc.), (ii) income level (e.g., users may be grouped and/or categorized based upon their income brackets and/or socioeconomic status, (iii) age brackets (e.g., users may be grouped and/or categorized based upon their age groups (e.g., 18-24, 25-34, 35-44, etc.), (iv) location (e.g., geographical region where a user resides), (v) type of area of a geographical region where a user resides (e.g., users may be grouped and/or categorized based upon types of areas associated with the users, such as at least one of urban, suburban, countryside, rural, etc.), (vi) education level (e.g., highest level of education completed by a user, such at least one of high school, undergraduate degree, graduate degree, etc.), (vii) occupation (e.g., users may be grouped and/or categorized based upon their occupation and/or job sector, such as at least one of healthcare, education, finance, etc.), (viii) family status (e.g., marital status and/or number of dependents and/or children of a user), (ix) ethnicity and/or race, (x) language proficiency (e.g., number of languages spoken and/or a proficiency level of a user), (xi) health status (e.g., at least one of user's general health, chronic conditions, disabilities, etc.), (xii) hobbies and/or interests of users (e.g., users may be grouped and/or categorized based upon their personal interests and/or hobbies, such as at least one of sports, arts, technology, etc.), (xiii) social media presence (e.g., a number of followers of a user, engagement by the user, and/or platforms used by the user), (xiv) community involvement (e.g., a user's engagement and/or participation in at least one of local community organizations, events, volunteering efforts, etc. may be analyzed and/or measured), (xv) environmental footprint (e.g., a user's ecological impact, such as at least one of energy consumption, waste generation, sustainable practices, etc. of the user, may be analyzed and/or measured, and/or (xvi) one or more other dimensions.

In some examples, a machine learning model may be used to generate classification clusters (using one or more unsupervised learning techniques, for example). The machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In some examples, the machine learning model may be used to group (e.g., categorize and/or cluster) users into groups of users based upon input information at least some of the plurality dimensions, user behavior information, user engagement metrics (e.g., the first set of user engagement metrics 524), and/or other information. In an example, the input information may be indicative of at least one of click patterns of users, video preferences of users, purchasing habits of users, link color preferences of users (e.g., users may prefer clicking on links of one color, such as green, over clicking on links of another color, such as orange), website visitation patterns, etc.

In some examples, a group of users determined using the machine learning model may correspond to an audience associated with the first content item 506. For example, the machine learning model may output at least one of a first group of users corresponding to the first audience (e.g., the one or more first audience-level metrics may be determined for the first group of users in response to the first group of users being output by the machine learning model), a second group of users corresponding to the second audience (e.g., the one or more second audience-level metrics may be determined for the second group of users in response to the second group of users being output by the machine learning model), etc. Accordingly, audience-level metrics and/or audience-level popularity scores associated with the first content item 506 may be determined based upon characteristics (e.g., multi-dimensional characteristics associated with one or more demographics, interests, etc. associated with the plurality of dimensions) associated with groups (e.g., audiences) output by the machine learning model. Alternatively and/or additionally, for each of one, some and/or all of the plurality of dimensions, a dimension-level score associated with the dimension (e.g., at least one of a social media presence score indicating how active a user is on social media, an environmental footprint score indicating a user's ecological impact, etc.) may be determined and used to determine a audience-level popularity label to assign to the first content item 506 and/or generate first enhanced content presentation interface 532 (e.g., the first enhanced content presentation interface 532 may be generated to include an indication of "This video is loved by environmentally-friendly users" based upon a determination that an environmental footprint score associated with users that engaged with the first content item 506 meets a threshold environmental footprint score). In some examples, the multidimensional scoring system is used for one or more first types of content item presentations. The one or more first types of content item presentations may comprise content item presentations associated with browser extensions, video presentations, organic search advertisements, and/or other types of content item presentations. In an example, the multidimensional scoring system may be used to determine one or more popularity scores and/or one or more popularity labels for the first content item 506 (and/or may be used to generate the enhanced content presentation interface 532) for content item presentations of the one or more first types of content item presentations.

In some examples, at least some of the disclosed subject matter may be implemented on a client device, and in some examples, at least some of the disclosed subject matter may be implemented on a server (e.g., hosting a service accessible via a network, such as the Internet).

Figure 8:
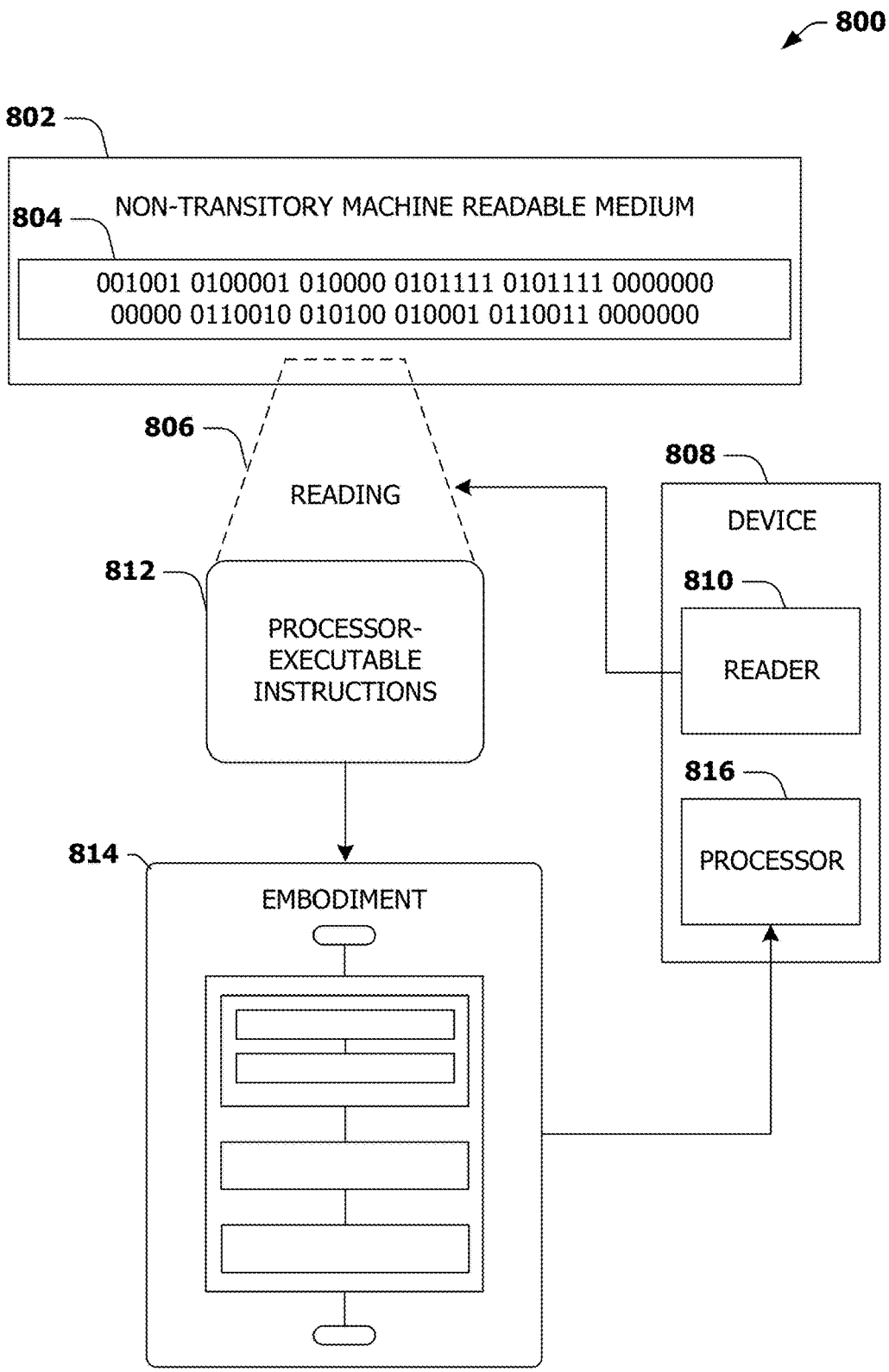
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4 and/or at least some of the example method 600 of FIG. 6, for example. In some embodiments, the processor-executable instructions 812 are configured to cause implementation of a system, such as at least some of the example system 501 of FIGS. 5A-5K and/or at least some of the example system 701 of FIGS. 7A-7D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
providing a first content item for display on a first client device;
receiving a first feedback signal indicative of one or more first user reactions to display of the first content item on the first client device;
providing the first content item for display on a second client device;
receiving a second feedback signal indicative of one or more second user reactions to display of the first content item on the second client device;
determining, based upon the first feedback signal and the second feedback signal, a first popularity score associated with the first content item;
assigning a first popularity label to the first content item based upon the first popularity score;
generating, based upon the first popularity label assigned to the first content item, an enhanced content presentation interface comprising the first content item;
receiving a request for content associated with a third client device;
in response to the request for content, selecting the first content item for presentation on the third client device; and
in response to selecting the first content item, presenting the enhanced content presentation interface, comprising the first content item, on the third client device.

2. The method of claim 1, wherein:
the enhanced content presentation interface comprises an indication of the first popularity label.

3. The method of claim 1, wherein:
the enhanced content presentation interface comprises a graphical object corresponding to a frame around the first content item.

4. The method of claim 1, wherein:
the providing the first content item for display on the first client device comprises displaying the first content item via a first internet resource presented on the first client device;
the providing the first content item for display on the second client device comprises displaying the first content item via a second internet resource presented on the second client device; and
the first internet resource and the second internet resource are associated with a first entity.

5. The method of claim 4, wherein:
the determining the first popularity score comprises:
determining first feedback information based upon feedback signals received in association with presenting the first content item on client devices via internet resources of the first entity, wherein the feedback signals comprise the first feedback signal and the second feedback signal;
submitting the first feedback information to a blockchain associated with tracking user engagement with the first content item across internet resources associated with a plurality of entities comprising the first entity and a second entity, wherein:
second feedback information associated with the second entity is stored on the blockchain; and
the second feedback information is associated with user engagement with the first content item in association with content item presentations in which the first content item is presented on client devices via internet resources associated with the second entity;
accessing the blockchain to identify an indication of an aggregated metric determined based upon the first feedback information associated with the first entity and the second feedback information associated with the second entity; and
determining the first popularity score based upon the aggregated metric.

6. The method of claim 5, wherein:
the first popularity score is equal to the aggregated metric indicated by the blockchain.

7. The method of claim 5, wherein:
the determining the first popularity score comprises:
accessing the blockchain to identify the first feedback information associated with the first entity and the second feedback information associated with the second entity;
determining, based upon the first feedback information associated with the first entity and the second feedback information associated with the second entity, the aggregated metric; and
storing the aggregated metric in the blockchain.

8. The method of claim 1, wherein:
the first content item comprises a video; and
the presenting the enhanced content presentation interface on the third client device is performed using a first video streaming mode associated with the enhanced content presentation interface, wherein the first video streaming mode is different than a second video streaming mode used to at least one of present the video on the first client device or present the video on the second client device.

9. The method of claim 8, wherein:
the first video streaming mode is associated with at least one of:
a first resolution associated with presenting the video;
a first bit rate associated with presenting the video;
a first contrast level associated with presenting the video;
a first brightness level associated with presenting the video; or
a first video presentation size associated with presenting the video; and
the presenting the enhanced content presentation interface on the third client device comprises displaying the video according to at least one of the first contrast level, the first brightness level, or the first video presentation size.

10. The method of claim 8, wherein:
the presenting the enhanced content presentation interface on the third client device comprises displaying the video in a serving area of an internet resource.

11. The method of claim 10, wherein:
the first video streaming mode is associated with a background modification feature; and
the presenting the enhanced content presentation interface on the third client device comprises:
modifying an interface of the internet resource to generate a modified interface; and
concurrently displaying the video and the modified interface via the third client device.

12. The method of claim 1, wherein:
the first content item comprises audio; and
determining the first popularity score comprises:
determining at least one of:

a first measure of events in which the audio of the first content item is muted; or a second measure of events in which the audio of the first content item is unmuted; and determining the first popularity score based upon at least one of the first measure of events or the second measure of events.

13. The method of claim 1, wherein:

determining the first popularity score comprises:

determining a measure of content item selections in which the first content item is selected; and determining the first popularity score based upon the measure of content item selections.

14. The method of claim 1, wherein:

the first content item comprises a video; and determining the first popularity score comprises:

determining a measure of video completions of the video; and determining the first popularity score based upon the measure of video completions.

15. The method of claim 1, wherein:

determining the first popularity score comprises:

determining one or more user engagement metrics associated with user engagement with the first content item by users in a first geographical region; and determining the first popularity score based upon the one or more user engagement metrics associated with the first geographical region; and the enhanced content presentation interface comprises an indication of the first geographical region.

16. The method of claim 1, comprising:

comparing the first popularity score with a threshold popularity score, wherein the assigning the first popularity label to the first content item is based upon the first popularity score meeting the threshold popularity score.

17. A non-transitory machine readable medium having stored thereon processor-executable instructions that when executed cause performance of operations, the operations comprising:

providing a first content item for display on a first client device;

receiving a first feedback signal indicative of one or more first user reactions to display of the first content item on the first client device;

providing the first content item for display on a second client device;

receiving a second feedback signal indicative of one or more second user reactions to display of the first content item on the second client device;

determining, based upon the first feedback signal and the second feedback signal, a first popularity score associated with the first content item;

assigning a first popularity label to the first content item based upon the first popularity score;

generating, based upon the first popularity label assigned to the first content item, an enhanced content presentation interface comprising the first content item; and presenting the enhanced content presentation interface, comprising the first content item, on a third client device.

18. The non-transitory machine readable medium of claim 17, wherein:

the first content item comprises audio; and determining the first popularity score comprises:

determining at least one of:

a first measure of events in which the audio of the first content item is muted; or a second measure of events in which the audio of the first content item is unmuted; and determining the first popularity score based upon at least one of the first measure of events or the second measure of events.

19. A computing device comprising:

a processor; and memory comprising processor-executable instructions that when executed by the processor cause performance of operations, the operations comprising:

providing a first content item for display on a first client device;

receiving a first feedback signal indicative of one or more first user reactions to display of the first content item on the first client device;

providing the first content item for display on a second client device;

receiving a second feedback signal indicative of one or more second user reactions to display of the first content item on the second client device;

determining, based upon the first feedback signal and the second feedback signal, a first popularity score associated with the first content item;

assigning a first popularity label to the first content item based upon the first popularity score;

generating, based upon the first popularity label assigned to the first content item, an enhanced content presentation interface comprising the first content item; and presenting the enhanced content presentation interface, comprising the first content item, on a third client device.

20. The computing device of claim 19, wherein:

the first content item comprises a video; and determining the first popularity score comprises:

determining a measure of video completions of the video; and determining the first popularity score based upon the measure of video completions.

* * * * *